US008416132B2

(12) United States Patent
Kirmuss et al.

(10) Patent No.: US 8,416,132 B2
(45) Date of Patent: Apr. 9, 2013

(54) RADIO COMMUNICATION AND GPS NAVIGATION DEVICE

(75) Inventors: Charles Bruno Kirmuss, Westminster, CO (US); Philip Charles Kirmuss, Longmont, CO (US)

(73) Assignee: Infinity Gear, LLC, Longmont, CO (US)

( * ) Notice: Subject to any disclaimer, the term of this patent is extended or adjusted under 35 U.S.C. 154(b) by 244 days.

(21) Appl. No.: 12/841,534

(22) Filed: Jul. 22, 2010

(65) Prior Publication Data

US 2010/0289695 A1 Nov. 18, 2010

Related U.S. Application Data

(62) Division of application No. 12/184,999, filed on Aug. 1, 2008, now Pat. No. 7,965, 231.

(60) Provisional application No. 60/963,661, filed on Aug. 4, 2007.

(51) Int. Cl.
*G01S 19/51* (2010.01)
(52) U.S. Cl. .................................. 342/357.34
(58) Field of Classification Search ............ 342/357.34, 342/357.4, 357.47, 417; 701/468, 470
See application file for complete search history.

(56) References Cited

U.S. PATENT DOCUMENTS

| | | | |
|---|---|---|---|
| 5,422,816 A | 6/1995 | Sprague et al. |
| 5,884,199 A | 3/1999 | Maki |
| 6,373,430 B1 | 4/2002 | Beason et al. |
| 6,518,889 B2 | 2/2003 | Schlager et al. |
| 6,912,397 B2 | 6/2005 | Liou |
| 6,941,147 B2 | 9/2005 | Liou |
| 7,330,150 B1 | 2/2008 | Beason et al. |
| 7,564,405 B2 | 7/2009 | Durst et al. |
| 2002/0186164 A1 | 12/2002 | Hsu et al. |
| 2005/0037777 A1 | 2/2005 | Liou |
| 2005/0093741 A1 | 5/2005 | Liou |
| 2005/0255860 A1 | 11/2005 | Liou |
| 2005/0272446 A1 | 12/2005 | Liou |
| 2005/0288039 A1 | 12/2005 | Liou |
| 2007/0021134 A1 | 1/2007 | Liou |
| 2007/0021135 A1 | 1/2007 | Liou |
| 2007/0248223 A1 | 10/2007 | Liou |
| 2008/0057879 A1 | 3/2008 | Liou |

OTHER PUBLICATIONS

Bruninga, Bob, APRS MIC-Encoder, Tucson Amateur Packet Radio Corp. Website, http://www.tapr.org/kits_mic-e.html, 2007.
"Radio System Keeps Vehicles Managed," Engineering Talk Website, http://www.engineeringtalk.com/news/ico/ico111.html, Jul. 10, 2001.

(Continued)

*Primary Examiner* — Dao Phan
(74) *Attorney, Agent, or Firm* — Dorsey & Whitney LLP

(57) ABSTRACT

A navigation device configured to connect to any type of communication device, such as a two-way radio or a cellular phone. The navigation device includes a LCD display and a user input device. The navigation device displays on the LCD the relative distance and direction of other navigation devices relative to the navigation device, as well as the speed, distance traveled, current location, altitude, temperature of the other navigation devices. Also, the user interface allows the user to scroll through different menu options and display options of the LCD. The navigation device is additionally configured to send text messages to other navigation devices. The navigation device transmits three NMEA sentences allowing text messages, waypoint names and locations, speed, course, direction and altitude to be sent between navigation devices.

26 Claims, 10 Drawing Sheets

OTHER PUBLICATIONS

Lovelock, Robin, "GPS and Radio Communications," GPSS from Sunninghill Website, http://www.gpss.tripoduk.com/radio.htm, May 30, 2002.

Lee, James, "GPSINIT/Tiny Track SBARA Workshop Project," Feb. 13, 2001.

"Tiny Trak 3 Review Summary," eHam.net Website, http://www.eham.net/reviews/detail/3708, Apr. 29, 2007.

Geelan, Ashley, "What is CTCSS," Scan Australia Website, http://www.scanaustralia.bigpondhosting.com/decode/CTCSS.html, 2003.

Frederick, Sue, "Motorola Introduces Ground-Breaking Miniature—A GPS Module," Motorola Media Center Website, http://www.motorola.com/mediacenter/news/detail.jsp?globalObjectId=3249_2673_23, Sep. 10, 2003.

Bruninga, Bob, "The New Smaller-Cheaper Mic-Lite," WB4APR, May 12, 1999.

"Pryme GPS Speaker Mic," Pyrme Radio Products Website, http://www.pryme.com/products/gpsproduct/GPSMIC , 2007.

"Fail-Safe, Innovative, Cost-Effective, Satellite Based Train Protection, Control and Command LOCOPROL," LOCOPROL Former Projects Analysis Report, Aug. 2002.

"GPSMIC Location Reporting System," Pyrme Radio Products website, http://www.gpsmic.com/ , 2007.

"Garmin Rino 120 Handheld GPS Navigator and 2-Way Radio," Amazon.com, http://www.amazon.com/Garmin-Handheld-Navigator-2-way-Radio/dp/B000065DQ2 , Sep. 13, 2007.

RADIO COMMUNICATION AND GPS NAVIGATION DEVICE

CROSS-REFERENCE TO RELATED APPLICATIONS

This application is a divisional of U.S. patent application Ser. No. 12/184,999 filed on Aug. 1, 2008 and entitled "Radio Communication and GPS Navigation Device" which claims the benefit under 35 U.S.C. §119(e) to U.S. Provisional Patent Application No. 60/963,661 filed on Aug. 4, 2007 and entitled "Hand held GPS field unit with speaker microphone capability that connects to any two way radio transceiver providing location information to other users of the combination GPS microphone unit as well as a PC or laptop connected to another transceiver with connection to Google earth or other software application," which are hereby incorporated herein by reference in their entireties.

FIELD OF THE INVENTION

This invention relates in general to Global Positioning Systems (GPS) and communications, and more specifically to GPS information transmitted over communications systems.

BACKGROUND

GPS portable devices are used by hikers, motorists, safety and military personnel, hunters and many others who may wish to know the exact location of their current position. A GPS device receives positional signals from a number of different satellites surrounding the Earth and uses this information to calculate its position. After the location has been determined, the location is illustrated to the user typically through a display. Some GPS devices also give the user the ability to store his location and track his progress by viewing the display. This display may simply give the coordinates to the user of his current location, or may be more sophisticated and indicate on an electronic map his location.

Presently there are a number of wireless communication devices that allow users to communicate across varying distances. For example, cell phones, two-way radios, internet-ready computers and portable electronics allow one user to communicate to another, either through speech or electronic messages. This communication ability is vital for some people, such as fire rescue personnel, and merely a convenience to others such as old friends who want to catch-up. As GPS data has become more popular, GPS devices have been incorporated into many types of communication devices. For example, some cell-phones also include a GPS receiver allowing the user to locate his own position.

The National Marine Electronics Association (NMEA) has established a standard to transmit location data between GPS devices. This standard is a NMEA sentence and is a self-contained line data. In accordance with NMEA protocol a transceiver will transmit all sentences it is programmed with to a receiver and the receiver selects only the sentences it is programmed to receive. In order for a receiver to read a particular sentence, the beginning of each sentence includes a prefix defining a sentence type and how the sentence should be interpreted. The current NMEA sentences transmit location data using latitude and longitude coordinates represented by degrees and minutes. Along with the location data is a user identification number that indicates what user the location data represents. The NMEA standards currently limit each sentence to 82 characters. Additionally, the NMEA transmission does not allow for a receiving device to request data be resent or indicate back to the transceiver that the sentence was read correctly. One limitation of the current NMEA sentences is that, in addition to length limitations, the data types are also limited. For example, current NMEA sentences only send location data and short identification numbers. Additionally, due to the current format, NMEA sentences do not allow for a user to transmit both location and user identification in the same sentence along with any other information.

There are a few GPS integrated communication devices able to send a unit's location to another device or user through a transceiver that transmits NMEA sentences to the receiver. For example, a GPS device combined with a mobile radio data modem provides the user's location data to a computer located elsewhere. However, this system requires an expensive interface to operate, such as a digital radio interface connected to a computer and running a software application and thus is limited to commercial users. In another example, a GPS device is integrated with a non-licensed personal radio, such as a "walkie-talkie." These devices only have a limited radio range, making them unsuitable for non-recreational activities. In addition to these two examples, there are other limitations. For example, multiple users cannot track each other using the GPS communication devices, only two users with the same device are able to have each other's locations displayed. Additionally, the transmission ranges are either prohibitively expensive for the average consumer or are so limited in range to be not useful for anything other than casual recreation activities. Finally, the devices are not able to transmit meeting points, waypoints or other information to other users nor allow each user to track his path, speed and estimated time of arrival to the meeting point. These are significant limitations as coordinates that are transmitted vocally to other users may be confused, mistaken or in the military context may be intercepted or overheard by enemy forces. Additionally, as only a limited amount of information is provided to the users, planning, meeting and organizing is much more difficult.

SUMMARY

One embodiment of the invention includes a GPS unit with the capability to connect to any type of communication device, thus allowing communication over any conventional two way radio or digital network without specialized equipment. The GPS unit itself may include a GPS receiver, microphone, speaker, microprocessor, push-to-talk function (PTT), liquid crystal display (LCD) and a joystick or other similar input device. These features allow the user to read from and interact with the device and communicate with other users. The GPS unit uses the communication device to transmit and receive data to and from other users. One type of data transmitted is travel information, such as each user's location, direction, temperature, speed, altitude and time to destination. Each unit is able to see the travel information for each group of users as well as each user separately. Additionally the unit displays the relative location of each unit compared with itself on the LCD, giving the user a pictorial illustration of each unit's location. Each user is also able to mark waypoint locations on his display and transmit the exact locations to all other units. Furthermore, users of different units are able to send text messages to each other, regardless of the type of communication devices being used.

The GPS location data and other information transmitted via the communication device may be formatted in a variety of NMEA sentences. The NMEA sentences transmitted and received may include all prior NMEA sentences as well as three novel sentences. These NMEA sentences include the user's identification number or name in addition to the other information included in each sentence. The first sentence transmits the user identification, location, travel speed, temperature, course and altitude in a single sentence. The second sentence transmits text messages and the user identification of the sender to other users. The third sentence allows a user to send or receive waypoints from other users, including the direct coordinates selected through the LCD input.

DETAILED DESCRIPTION

Figure 1:
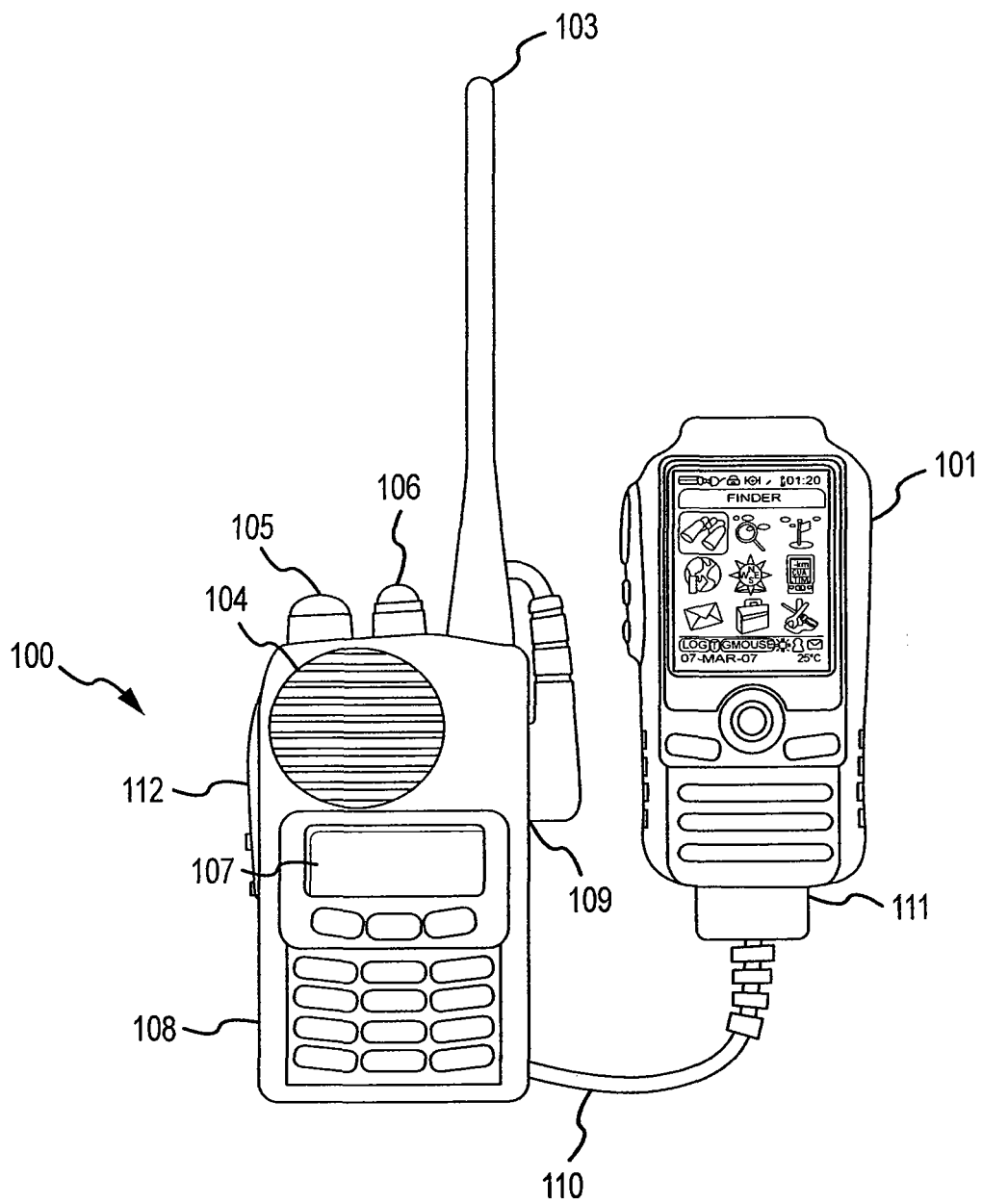
FIG. 1 illustrates a front view of a GPS unit connected to a two-way radio transceiver.

Described herein are various embodiments of a GPS unit for use with a variety of communication devices. The GPS unit connects to any type of communication device, for example a two-way radio, cell phone, computer or personal digital assistant with broadband access or a digital modem. The unit allows a user to track his location and other travel information, track other users' locations and their travel information and communicate to other users. The GPS unit may include a microphone, speaker, GPS receiver, push-to-talk button (PTT), power button, memory, microprocessor, compass, clock, temperature sensor, altimeter, battery, function key, universal serial bus (USB) port, radio interface port, joystick or any combination of the above elements. Additionally, the GPS may be combined with other functions and elements not listed. The microprocessor receives inputs from the user, clock, compass, GPS receiver, memory and other internal and external signals. The microprocessor processes the data, performs calculations and provides outputs to a LCD, USB and radio interfaces as well as any other element requiring information from the microprocessor.

A LCD main menu screen displays a number of different icons and information. The informational icons may include a battery power indicator, GPS status, local time, calendar, temperature, altitude, message received, backlight on, and track mode. The LCD functional icons may be used to access the different functions of the unit. From the main screen the user may choose between different functional icons, such as finder, group list, waypoints, unit data, tracks, compass, messaging, satellite signal strength, and tools. A finder icon allows the user to locate a specific unit showing that unit's distance, bearing and estimated time of arrival relative to the user selecting the specific remote unit as well as the tracks, location, temperature, altitude, heading and speed and area previously covered by the remote unit. Similarly, a group icon allows the user to select a unit or group of units, tracked collectively, and receive all the relevant information such as direction, speed, temperature, elevation, location, etc. for the entire group or specific units within the group. Under a waypoints icon the user can add, view, save, send or delete waypoints. Saved waypoints by the user may be transmitted to other field units electronically, avoiding the need to verbally transmit the waypoint characteristics, which takes both time over a radio channel as well as possibly resulting in errors (e.g., radio transmission is garbled, user incorrectly writes down the waypoint information, etc.). A unit data icon shows the time, data, altitude, speed, source, location, maximum speed, temperature, average speed and distance traveled by the user. A tracks icon allows the user to start, stop and erase a travel course. A compass icon illustrates the current directional heading. A messaging icon allows the user to send and receive text messages, the user is able to compose a message by a virtual keyboard that appears on the screen when that function is selected. A satellite signal strength icon illustrates the unit's location, time, date, altitude, speed, and GPS fix. Finally, a tools icon supplies all the system's data and settings and allows a user to modify certain settings, displays and functions of the GPS radio microphone unit.

The GPS unit may be connected to any type of communications device that includes an audio input and a sound output. For example, a two-way radio, cell phone, digital radio, modem, computer or personal digital assistant with broadband or other internet access. The GPS unit connects to the communication device wirelessly or through a connection cord. Once the unit is connected to the device, the user may then use the unit, versus the communication device, to transmit and receive audio and other communication signals. For example, when connected to a two-way radio, a user uses the GPS radio microphone unit to speak to another user using a microphone in the GPS radio microphone unit, as well as to transmit location, waypoint, text messages, unit identification and a user identification name.

The unit uses the communication device's transmission method, regardless if it is analog or digital, to transmit audio signals. For example, if the communication device is an analog two-way radio, the user presses the PTT button, communicates his message and after releasing the PTT button, but prior to the end of the transmission, the GPS radio microphone unit sends a fast frequency shift keying (FFSK) data burst over the audio carrier of the RF signal. The data burst is transmitted and received to all units on that radio channel within the operating range of the radio. The data burst includes multiple types of information about that particular unit and user. For example, the user's name, unit's hardware identification number, location, speed, direction, altitude and any text messages that the user may have composed. If the communication device is a digital radio, such as a cell phone, then after the user presses the PTT digital data is sent to each unit via the digital modem. The data transmitted through the communication device in either format may be in the form of a conventional NMEA sentence, in any other standard format or in a proprietary NMEA sentence discussed herein. The GPS field units are programmed with a Group ID and Individual ID Number. The ID numbers transmitted by one unit are received and stored on any GPS units that are programmed with the same Group ID as the sender. The sender may also send out information to select receivers. This data is stored on the respective receiving unit on the unit's memory.

In addition to receiving a unit's information after the user has pressed the PTT button, another user or person operating a base station or a GPS unit may "query" a particular unit. To query a specific unit the user selects the desired unit using the LCD display. Once selected the GPS unit sends a hex command, or other similar transmission, to the unit requesting its information. The unit queried then transmits its information back to the specific querying unit, all units or on a select group of units. The querying unit and any other units receiving the information, then may display the queried unit's speed, direction, location, altitude, temperature and all areas that the user has traveled.

The data transmitted in either analog or digital is able to be encrypted or remain non-encrypted. This option allows for some users, such as the military, to send sensitive information like troop location to other users. Additionally this option allows other users, such as search and rescue teams, the ability to transmit to all available receivers. In addition to transmitting the information to other users in the field, the GPS unit may transmit the same information to a base station or similar removed location by connecting the GPS unit to a computer or laptop via the serial or USB connection. The base station may include a computer and a monitor and display every user's location, altitude, temperature, speed, direction, etc., storing onto the PC as well as the receiving GPS unit that is being used as an interface this information. In digital mode, the GPS device may or may not be used depending on the operating requirements of the receiving station. For example, a digital radio with a serial port may be directly connected to the serial port of a personal computer. The digital radio may then receive all NMEA sentences and other radio transmissions sent by any GPS unit. The computer may then extract the data from each of the NMEA sentences and display the location, speed, direction, heading, altitude, waypoints, etc. of each unit.

The travel information is calculated by the microprocessor and the GPS receiver. The GPS antenna receives positional signals from satellites and the GPS receiver calculates the location of the device. The microprocessor uses those calculations to determine the course, average speed, maximum and minimum speed, estimated time of arrival at a waypoint, current speed and direction of the user. Additionally, the information allows the microprocessor to determine where the unit is with respect to all the other units in the field.

In addition to transmitting his travel information, a user may connect the GPS unit to a computer, flash drive, or personal digital assistant and download all the data stored in the GPS unit. This allows the user to track his progress and preserve a map of his travels. The data may be overlaid on mapping software giving the user an exact map with noted landmarks of his locations. Additionally, data from multiple units may be downloaded to a single computer to create a detailed map of each user's progress and paths throughout a trip or excursion.

Referring now to the figures, FIG. 1 illustrates a front view of a GPS radio microphone unit 101 connected to a communication device 100. The communication device 100 may be any type of device that includes an audio input and output. For example, a digital or analog radio, cell phone, computer with radio or broadband access, mobile phone, personal digital assistant, or a digital modem. The unit 101 transmits information to other users through the communication device's 100 communication method. This method may be analog or digital, for instance a broadband connection, cellular network, radio waves or hard-wired cables. However, the GPS unit 101 may be integrated with a transceiver and receiver allowing the GPS unit 101 to operate as a standalone device without the addition of a separate communication device.

In the embodiment illustrated in FIG. 1, the communication device 100 is two-way radio and may include a speaker and microphone 104, display screen 107, PTT button 112, keyboard or number pad 108, connection jack 109, volume and power controller 105, channel frequency controller 106, antenna 103 and battery (not shown). Additionally, the communication device 100 may include a scrambler or serial port for encrypting digital and analog signals. Depending on the type of communication device 100, more or less elements may be included. For example, if the device is a cell phone or computer there may be no PTT button 112 or channel frequency controller 106. Similarly, if the device is a two-way radio there may be no display screen 107 or number pad 108. As there are thousands of communication devices on the market, the communication device 100 shown in FIG. 1 is merely to illustrate how the GPS unit 101 connects to a device and how the reception and transmission of information operates.

In a two-way radio implementation the user manipulates the channel frequency controller 106 to select a desired frequency at which to transmit signals. After selecting a matching frequency with other radios, the radio can communicate with them. For example, when the user presses the PTT button 112, the radio transmits audio picked up by the microphone 104 and when the PTT is released the speaker omits audio transmitted by other radios. Although FIG. 1 illustrates the volume and power controller 105 as a singular knob those functions may be separated into multiple buttons or knobs. Similarly, the channel frequency controller 106 and PTT button 112 may be buttons, knobs or any other types of inputs.

Figure 1A:
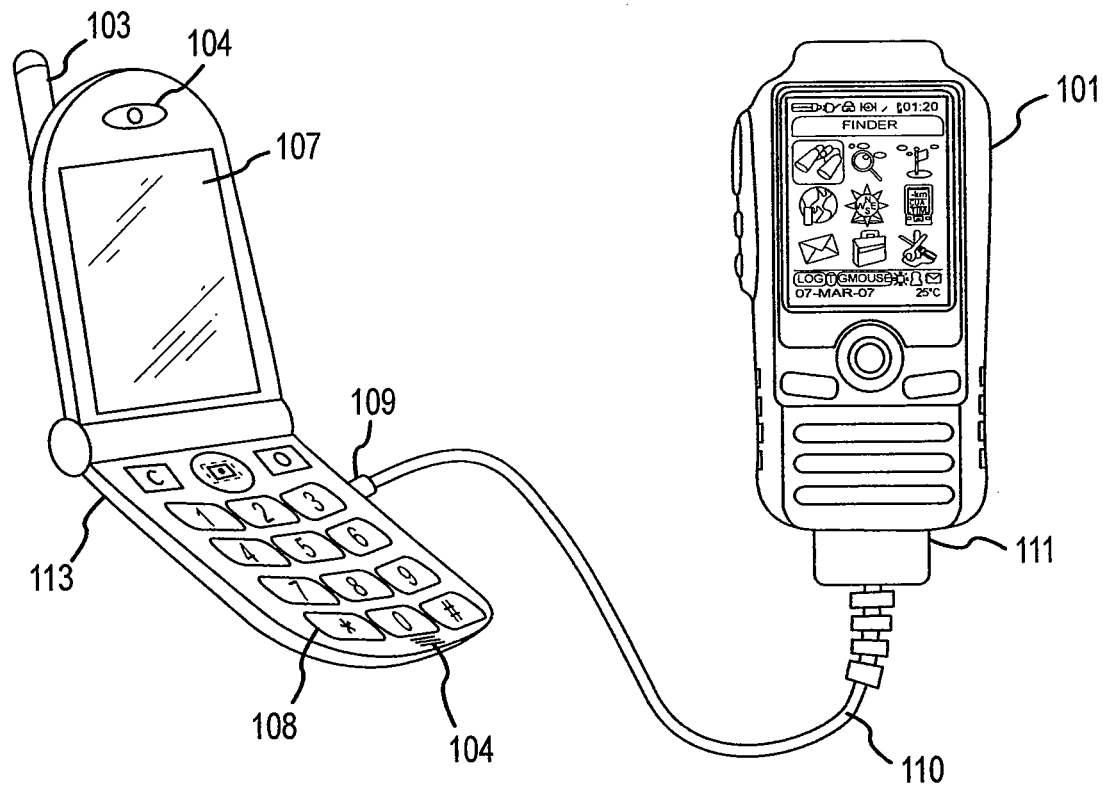
FIG. 1a illustrates a front view of a GPS unit connected to a cell phone.

Referring to FIG. 1a, in a cell phone implementation, the communication device is a conventional cell phone connected to the GPS unit. A cell phone 113 may include a number pad/keyboard 108, a connection jack 109, a display screen 107, a speaker/microphone 104 and an antenna. The GPS unit 101 is connected to the connection jack 109 of the cell phone through the signal cable 110, discussed in more detail below. When connected, the GPS unit 101 transfers signals using the cellular network automatically through the signal cable 110. The user communicates over a cellular network, using the number pad/keyboard 108 to select the correct connection number and then may hear and speak via a speaker/microphone 104. An antenna 103 transmits the signals from the communication device 100 to other devices either through a radio network or a cellular network, depending on the type of device selected by the user.

For instance, in one embodiment, the GPS unit is connected to the connection jack 109 which may be an existing microphone and speaker (e.g., headset input) connection of a conventional cell phone. The cell phone initiates a conventional call. To communicate with the GPS unit coupled to the cell phone of a second subscriber, the first subscriber (after the cell connection is complete) presses the PTT button on the GPS unit and talks, and at the end when the PTT button is released, the audio (microphone) output of the GPS device connected to the microphone input of the cellular device then transmits the audio FFSK burst from the GPS device, and the burst is transmitted to the second GPS unit in the same manner as audio is transmitted over the cellular network. The receiving cell phone sends this audio data from the speaker output connection to the speaker input connection of the second GPS unit and the second GPS unit then displays and stores the GPS location and/or other data sent by the originating GPS unit and cell phone.

Once the communication device 100 is connected to the GPS unit 101, the user has the option of using only the input and output elements on the GPS unit 101 to communicate with others and the communication device 100 acts to transmit and receive information, which is displayed and converted to audio. Therefore, the communication device 100 may include only a receiver and a transceiver with audio signal capabilities. Additionally, as stated above, a radio receiver/transceiver may be integrated within the GPS unit 101, allowing the GPS unit 101 to be a standalone device and operating without connecting to the communication device 100.

The communication device 100 may have a connection jack 109 or an input for or an integrated wireless card. The connection jack 109 or wireless card connects the communication device 100 to the GPS unit 101. In one embodiment the GPS unit 101 is connected to the communication device 100 via a signal cable 110. The signal cable 110 connects to the communication device 100 through the connection jack 109 and connects to the GPS unit 101 through the connection port 111. The signal cable may be any type of cable and the connection end points may be configured to attached to a variety of communication devices. Additionally, the connection port 111 may be a USB port or other type of cable connection allowing the cable 110 to transfer signals between the communication device 100 and the GPS unit 101. Similar to the connection jack 109, the connection port 111 may include a integrated or attached network card to wirelessly connect the GPS unit 101 to the communication device 100. The connection port 111 and the signal cable 110 may be designed in any manner to transmit signals between the GPS unit 101 and communication device 100, and any signal transmission method would suffice.

Once connected, either wirelessly or through a cable, the communication device 100 and GPS unit 101 transfer a variety of signals between each other. The connection allows the GPS unit 101 to operate and replace the communication device's 100 functions. For example, when connected, the user of the GPS unit 101 may use the microphone input and speaker output of the GPS unit 101, although the information is actually transmitted and received through the communication device 100. This provides the user with flexibility, as he may wish to store the communication device 100 and still be able to use its transmission functions. For example, the communication device 100 may be placed in a backpack or on a belt clip, far away from the user's mouth and the user may still communicate to others via the GPS unit's 101 speaker and microphone. Also, the GPS unit's 101 PTT button function allows for the user to press the PTT button on the GPS unit 101 to activate the PTT function on the communication device 100. However, the user may also use the inputs and outputs on the communication device 100, even when connected to the GPS unit 101.

The signals transmitted between the GPS unit 101 and the communication device 100 may include a PTT, positive and negative speaker and microphone inputs and outputs, data, ground, and power. However, depending on the type of communication device 100 and the type of connection to the GPS unit 101, these signals may vary. For example, the GPS unit 101 may receive a power charge from the communication device 100 or may not receive any additional power from the device 100. Additionally, there may be more signals included, for instance if the communication device 100 includes a large display screen, the GPS unit 101 may transmit signals allowing the icons on the GPS unit's 101 LCD screen to be displayed on the communication device's 100 display screen. As state above, once the communication device 100 and GPS unit 101 are connected, the user may use the GPS unit 101 to view and select all signals that are transmitted to and from the communication device 100. For example, when the GPS unit 101 is connected to the cell phone 113 the speaker input of the GPS unit 101 is connected to the speaker output in the cable jack 109 of the cell phone, and the microphone input of the cell phone is connected to the microphone output of the GPS unit 101. This allows the GPS unit 101 to access and replace the functions of the cell phone 113.

Figure 2:
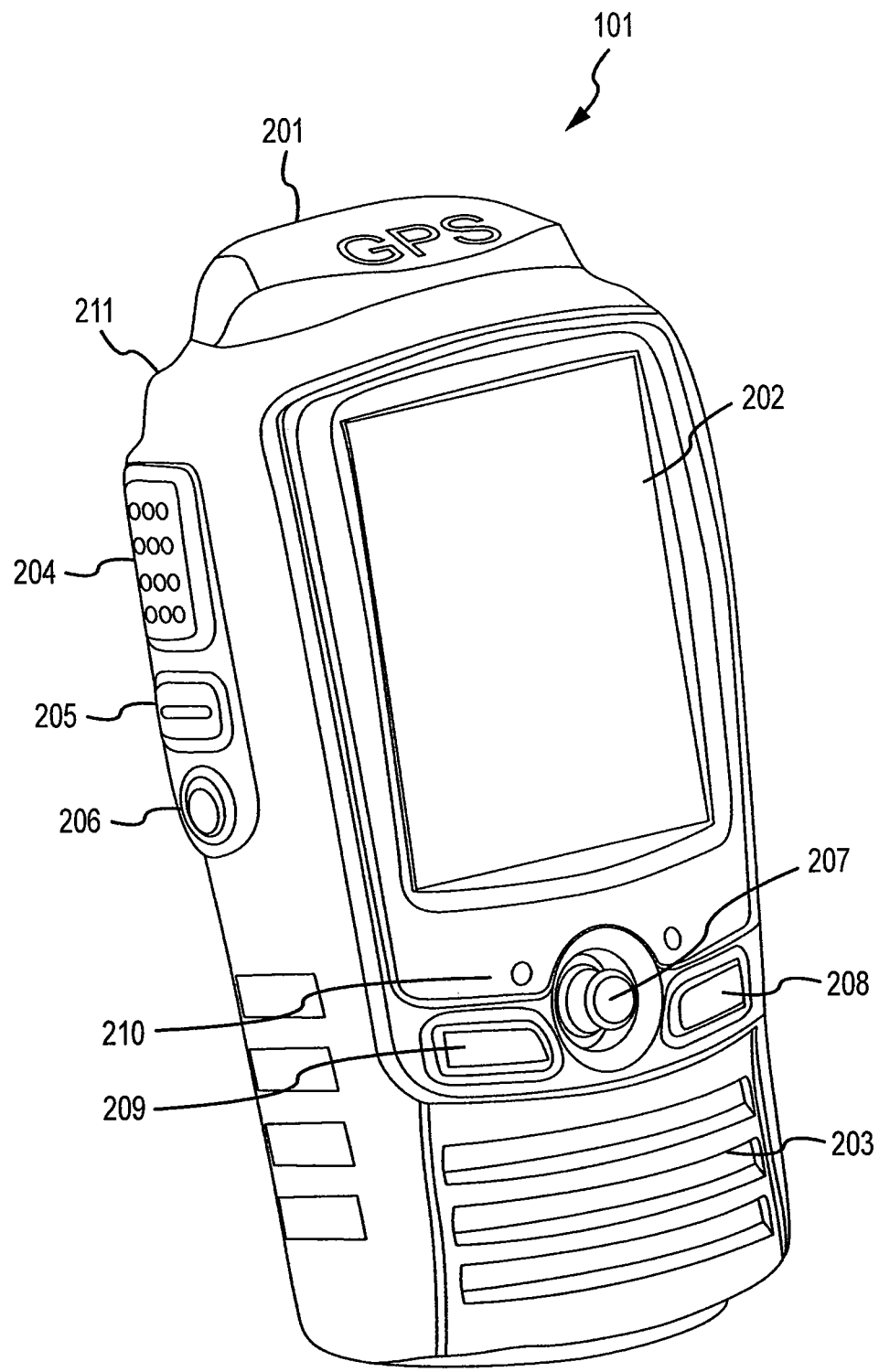
FIG. 2 illustrates a perspective view of the GPS unit.

FIG. 2 is a perspective view of the GPS unit 101. The GPS unit 101 includes a GPS receiver 201, LCD screen 202, speaker 203, PTT button 204, function key 205 power button 206, joystick 207, cancel button 208, SOS button 209209, microphone 210, internal circuitry (see FIG. 4) and a casing 211. The GPS unit 101 uses the communication device 100 to transmit and receive electrical signals, but once connected to the communication device 100 the user only needs to provide inputs to the GPS unit 101 to transmit and receive messages. For example, in one embodiment, the functions of the communication device 100 may be controlled by the GPS unit 101.

The GPS receiver 201 may include any type of antenna able to receive signals from GPS satellites surrounding the Earth and any type of device able to perform GPS calculations. For example, the antenna may be passive, active, re-radiating, or helix. Also, the receiver may be an electronic chip, microprocessor or other electronic circuit able to calculate location based on GPS satellite information. In one embodiment, the GPS receiver 201 is positioned above the LCD screen 202, and the receiver and antenna are integrated into the GPS receiver 201. However, the receiver 201 may be placed anywhere on the GPS unit 101 or may be detached from the unit 101. Additionally, the antenna may be external to the receiver 201. For example, the GPS unit 101 may include a cord or wireless connection allowing a detached antenna. An external antenna could be placed on the roof of a car, clipped to a hat of a user, etc. for allowing better reception.

The receiver obtains the satellite data from the antenna and then computes the unit's latitude and longitude, speed, direction or travel, and when the GPS receiver 201 is able to receive positional signals from more than two satellites the unit computes it's elevation The receiver may update the location of the GPS unit 101 every second or at any other time interval. Also, in addition to the satellite information, the GPS receiver 201 may also receive a Wide Area Averaging System (WAAS) signal. This signal allows for more precision in determining the unit's 101 current position. However, in areas without a WAAS signal, the receiver 201 may determine the unit's 101 location based on the satellite signals. Furthermore, the receiver 201 and its functions may be integrated within the internal circuitry of the GPS unit 101. For example, the GPS receiver 201 may only include a GPS antenna and the internal circuitry of the GPS unit 101 may perform the position calculations.

The LCD screen 202 may be any type of electronic display such as liquid crystal, plasma, light emitting diodes, vacuum florescent, surface-conduction electron-emitter display. Additionally, the LCD screen 202 may be orientated anywhere on the GPS unit 101, for instance it may be located on the back or front and may be any combination of dimensions. In one embodiment, the LCD screen 202 is a liquid crystal display which may include a layer to convert the linearly polarized light, normally emitted from a liquid crystal display, into circularly polarized light. This layer allows a user with polarized sunglasses to view the screen without distortion. The LCD 202 is located on the front of the GPS unit 101 towards the top, above the joystick 207, cancel button 208, SOS button 209, microphone 210, and speaker 203. The LCD screen 202 may turn off or dim when not in use, helping to conserve the power of the unit 101. Additionally, the LCD screen 202 includes a backlight that provides more contrast to the screen allow a user to view it at night or in dim light conditions. The LCD screen is discussed in more detail below, but generally allows the user to view information about his location or information about other users and additionally allows the user to provide inputs such as audio, text messages and waypoints, send other information to other users and navigate the menus.

The speaker 203 may be any type or size speaker and additionally may be located anywhere on the GPS unit 101. In one embodiment, the speaker 203 is located towards the bottom of the GPS unit 101 and below the LCD screen 202. However, this location is not necessary for the operation of the speaker or GPS unit 101. The microphone 210 may be any device cable of detecting an audio noise and converting it to an electric signal. Similar to the speaker 203, the microphone 210 may be located anywhere on the unit 101. In one embodiment the microphone 210 is located between the speaker 203 and the LCD screen 210. However, the microphone 210 and speaker 203 are not essential for the GPS unit 101 to operate. The user may use the microphone and speaker on the communication device 100 in order to transmit audio communications to other users. Additionally, a headset may be connected either wirelessly or through a cable to the GPS unit 101 allowing the user to have the speaker 203 and microphone 210 elements closer to his mouth. Also, a two-way radio or a cell phone may include microphone and speaker connections external to the device, such as a car-phone, and as discussed above with respect to the headset, the speaker 203 and microphone 210 of the GPS unit 101 may not be used by the user to hear and transmit audio. Furthermore, the GPS unit 101 may be used without audio communication capability between users. If the GPS unit 101 is used without audio capabilities, the user will be able to track his own location, speed, altitude, temperature, direction and other travel information as well as that of the other users. However, the user will not be able to send audio communications to those users if the microphone portion has been disabled or not connected.

The PTT button 204 allows the unit to toggle between transmit and receive modes for the GPS unit 101. Using a traditional analog two way radio or broadband transceiver connected to the device, when the user presses the PTT button 204, the device will activate a radio frequency carrier of the two way radio and transmit the audio signals detected by the microphone 210, such as the user's voice, and upon release of the PTT button, will turn off the microphone and allow an FFSK data burst to be sent over the radio frequency carrier which will be transmitted over the selected channel or frequency as set in the two way radio or broadband device or (phone number in the case of a cellular phone). The FFSK data burst includes the unit's information, such as identification, location, direction, speed, altitude, etc., which is received by units or computers that are on the same radio frequency or channel and that may or may not be part of the Group ID that the transmitting GPS device has been programmed for. The PTT button 204 may be any type of input, such as a knob, dial, switch or toggle. Additionally, the PTT button 204 may be positioned anywhere on the GPS unit 101, however in one embodiment the PTT button 204 is located on the side of the unit 101.

The function button 205 serves as an interface "quick jump button" for the user to quickly select and jump between related user informational screens instead of exiting one function and entering another. When the function button 205 is selected, the unit displays a menu screen with the names of certain functions. These names correspond to the same functions as the functional icons displayed on the main menu of the LCD 202. When a name is selected, the unit displays the same information as if the user had selected a particular function via the functional icon on the LCD main menu.

The power button 206 allows a user to turn the GPS unit 101 on or off. The power button 206 may be a button, switch, knob or any type of input. In one embodiment the power button 206 is a depressible button and is located on the side of the GPS unit 101. However, the power button 206 may be any size or shape and be located anywhere on the unit, such as on the top, back, bottom or front. Additionally, the power button may be configured such that it does not affect the use of the microphone and speaker of the GPS unit 101. For example, the microphone and speaker of the unit may still be used by the user to communicate audio via the communication device 101, although the rest of the GPS unit 101, such as the LCD and GPS receiver, is powered off. This allows the unit 101 to be used as a remote speaker/microphone for the communication device 100, in the same way that a headset would be used.

The joystick 207 allows the user to select different functions on the LCD screen 202. The joystick 207 may be any type of input device, such as a wheel, knob or touch pad. In one embodiment the joystick 207 is a stick on a rotating pivot base. The joystick 207, moves a selection tool over different icons allowing a user to choose his preferred function. The joystick 207 may be located between the LCD screen 202 and the speaker 203 or at any position on the unit, such as the back, side or top. The joystick 207 is able to swivel 360° and may include an input allowing the user to highlight and select a function by pressing down on the joystick 207. Or the joystick 207 may include a depressible button on its top surface, allowing a user to press the top of the joystick 207 in order to select an icon. Additionally, the joystick 207 may be omitted from the unit 101. For instance, the LCD screen 202 may be a touch-screen allowing the user to use his fingers or an object such as a stylus to directly select an icon or function. Furthermore, the joystick 207 may be combined with a touch-screen LCD 202 allowing the user multiple options for selecting icons and other menu items.

The cancel button 208 is an escape button or back button and allows the user to return to a prior menu or exit the current menu. The cancel button 208 may be a button, switch, knob or any type of input. In one embodiment the cancel button 208 is a depressible button and is located on the front of the GPS unit 101 below the LCD display 202 and to the right of the joystick 207. However, the cancel button 208 may be any size or shape and be located anywhere on the unit, such as on the top, back, bottom or front. The cancel button 208 activates two separate functions of the GPS unit 100. First, as discussed in greater detail below with respect to FIG. 4 and others, the GPS unit includes a main menu screen with functional icons displayed on the LCD. The main menu provides access to numerous sub menus and device functionality. The cancel button 208 is a menu navigation button that returns the GPS unit to the main menu from some sub menu or functionality. For example, when the cancel button 208 is selected the unit will display the previous level of the selected function that the user is currently navigating. In one embodiment, the GPS unit is configured such that when a user presses the menu/SOS button momentarily, e.g., less than 2 seconds, while device is displaying a sub-menu or functional screen, the menu will exit the current screen and return to the main menu. Second, the cancel button 208 allows a user to go back one letter when using the virtual keyboard displayed on the LCD when using the text message function. Third, when the user selects and holds the cancel button 208 for two or more seconds, the unit locks access to the various functions. This prevents the unit from selecting any functions or alerting any settings if the user accidentally brushes against the unit or touches the joystick.

The SOS button 209 configures the unit 101 to transmit a SOS alarm. The SOS alarm transmits a distress message to all units within a user's group or to all units and/or communication devices on the same frequency at a certain time interval. The SOS signal may be used as an emergency location button to identify a user in need of assistance When a user presses and holds the SOS button 209 e.g., greater than 2 seconds, the unit transmits a timed SOS message over the selected channel. The SOS message may be configured to provide the unit's position, direction, speed of travel, and altitude to other users. The SOS transmission may be either transmitted via the third NMEA sentence discussed below, or may be transmitted in any conventional NMEA sentence and only include the unit's position information and identification. The SOS message may be set to be transmitted at a specific time interval, for example every five minutes. This may be important if a user is injured or sick and knows he will not be able to repeatedly send out distress calls. Also, the automatic transmission of the SOS allows a user to focus on his current situation instead of remembering to transmit his location to all users every few minutes.

Positional information may also be programmed for automatic periodic transmission, e.g., transmission every second or on some other periodic schedule, to allow tracking of the GPS unit (and hence the user). For example, a discrete GPS unit, numerous units, and/or a central control computer coupled with a GPS unit may receive the periodic positional bursts from a user with a GPS unit tracking a perimeter of a wild land fire, driving a truck, hiking, or in an airplane. Therefore, the central command unit would receive positional data from the perimeter as it is transmitted from the device.

The cancel button 208 and SOS button 209 may be programmed using firmware to offer other quick and customized needs. For example, the cancel button 208 may be set such that when it is selected and held down for four seconds it displays the Finder function or any function desired to be quickly displayed by the user.

The casing 211 surrounds the internal circuitry and holds the elements together. The casing 211 may comprise any type of material, such as plastic, wood, metal, rubber or any combination of materials. In one embodiment the casing 211 is a hard plastic that may be able to withstand significant forces. The casing may also be constructed of a flame retardant material offering a high temperature rating to withstand use of the device within burning structures entered into by firefighters. For instance, the casing 211 may be strong enough to survive a six-foot drop, if the user accidentally drops the GPS unit 101. The casing 211 may also surround the buttons 204, 205, 206, 208, 209, the joystick 207, speaker 203, microphone 210 in such a manner that it blocks water, dust and other particles from reaching the internal circuitry. In one embodiment the casing 211 seals around the perimeter of the LCD 202 to hold it in place. However, the casing 211 may be a clear color and completely cover the LCD 202, while still allowing the user to view the display.

Figure 3:
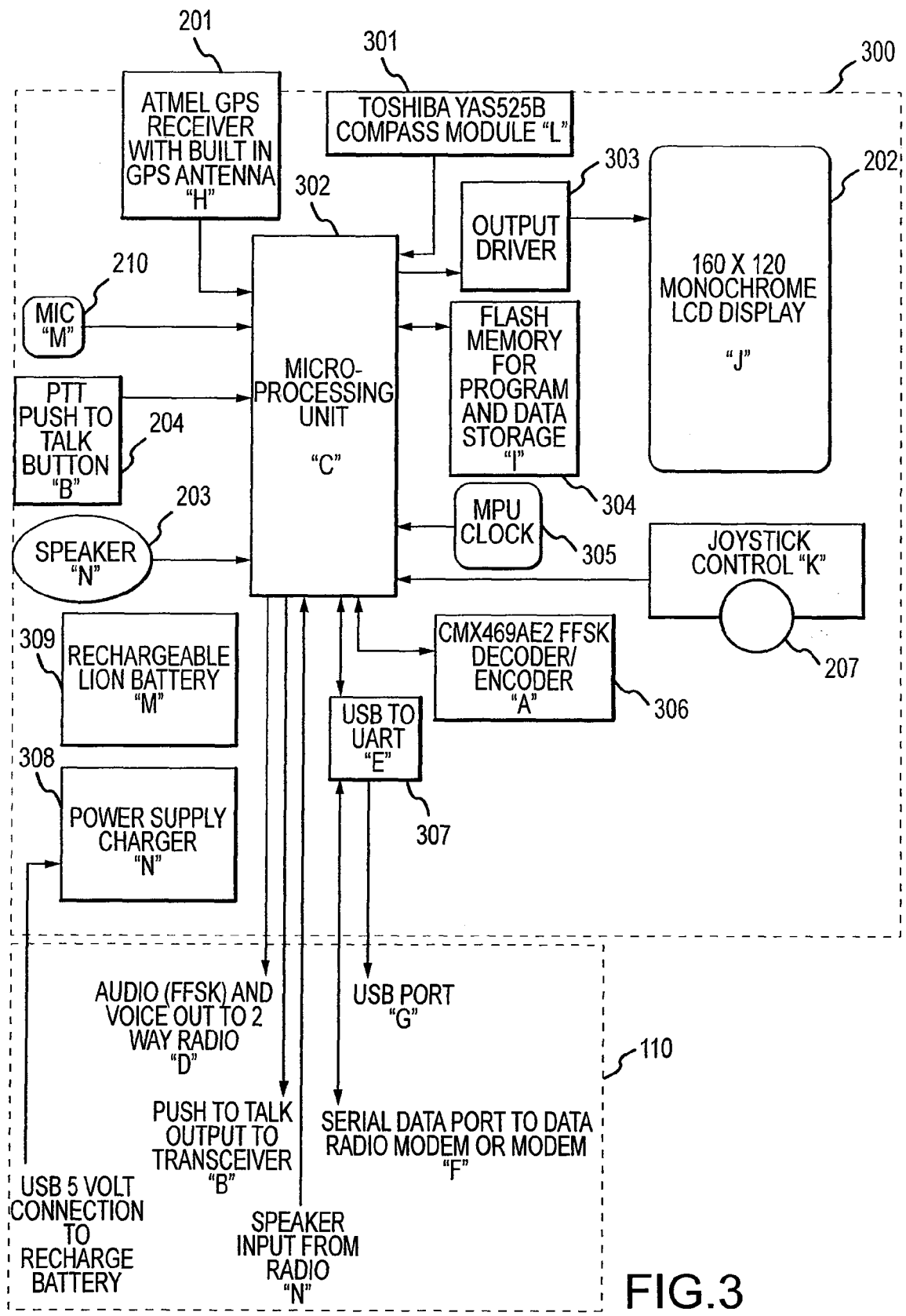
FIG. 3 illustrates a block diagram of the GPS unit.

FIG. 3 is a diagram of the internal circuitry of the GPS unit 101 illustrating the signals to and from the microprocessor 302. The internal circuitry 300 comprises any type of circuit board or multiple circuit boards connected to each other, such as a printed circuit board or hybrid integrated circuit. The internal circuitry 300 comprises the electrical connections and components for the GPS receiver 201, LCD display 202, joystick 207, speaker 203, microphone 210, PTT button 204, compass 401, output driver 403, microprocessor 302, memory and data storage 304, clock 305, encoder/decoder 306, USB to UART 407, power supply charger 308 and battery 309. Additionally, the internal circuitry 300 provides outputs to the connection port 111 allowing the GPS unit 101 to control the functions of the communication device 100 and receive and transmit information through the communication device 100. Also, the circuitry 300 provides an input for a cable to recharge the battery 309.

The microprocessor 302 receives electronic signals and executes program code to achieve the correct outputs. Any type of microprocessor may be implemented within the circuitry 300 depending on the desired speed and functionality of the GPS unit 101. Additionally, the microprocessor 302 may be a single chip or multiple processors linked together. The microprocessor 302 receives inputs from the GPS receiver 201 and may calculate and store the location of the unit 101. The microprocessor 302 performs calculations related to the different functions of the GPS unit 101. For example, the microprocessor 302 uses the location information and time to determine distance traveled, speed, course, estimated time of travel to a waypoint or point of interest, and the directional relationship and distance to other units. The microprocessor 303 drives the LCD 202 to display different menus, screens and information depending on the inputs from the joystick 207. The microprocessor operates the LCD 202 through the use of an output driver 303, which drives the functionality and display based on signals received from the microprocessor 302. The microprocessor 302 also receives inputs from a clock 304, encoder/decoder 306, speaker 203, PTT button 204, memory 304, microphone 210 and compass 301. Furthermore, the microprocessor 302 may including mapping software allowing a user to see his exact location displayed on the LCD on any type of map, including topographic, street, or contour.

The microprocessor 302 formats the information to be transmitted in NMEA sentences. In addition to conventional NMEA sentences, the microprocessor 302 may use three additional NMEA sentences. These sentences, detailed below, allow a user to text message other users, send waypoints directly to each user, locate other users and view their current location, altitude, course and speed. Each sentence may be designed to include any information, for instance the group identification may or may not be included and the different transmitted pieces of information may be included in any of the sentences or in any order. Additionally, the NMEA sentences are not limited to only the GPS unit 101 but may be used within any transmission device using a NMEA standard or format.

The three sentences each begin with a "$" character and include an asterisk "*" before the checksum and sentence delimiter. The $ character alerts the receiver to the beginning of the NMEA sentence. The checksum consists of two hex digits that follow the asterisk. The hex digits are the sum of the bits between the $ and *, or any number of bits combination. The receiver adds the bits it has received and then verifies the accuracy of the sentence transmitted by comparing its sum with the checksum number. If the checksum number and the receiver's number do not match, the receiver may discard the sentence because it most likely contains errors. After the checksum, each sentence includes a carriage return linefeed indicating the end of the sentence. For example, each sentence ends with 0D 0A which alerts the receiver that the sentence has terminated.

The first NMEA sentence has the following formula: $GPWPL,DD.MMMMM,d,DDD.MMMMM,d,<Waypoint-Name>,<ICON>,<Altitude>,<SCODE>, <GroupID>, <Date>,<Time>*CC<CR><LF>. The first NMEA sentence includes a series of data fields pertaining to the type of transmission, location of the user, waypoint name, waypoint ICON index, altitude, transmitted SCODE, group identification name, data, time, checksum and sentence termination delimiter, each of which are discussed in turn. First, the beginning of the first NMEA sentence, as well as the second and third sentences, starts with a $. As discussed above, this indicates the beginning of the sentences. A transmission type of the sentence is represented by "GPWPL" which indicates that the sentence is a designated waypoint intended for a GPS receiver. For example, the "GP" indicates to the receiver that it is designated for a GPS receiver and the "WPL" indicates that the following data is a waypoint location.

A waypoint is a set of coordinates that define a specific location. Waypoints may be used to indicate a meeting point for different users or to let a user send a location where he has previously been or intends to head towards. The waypoint positional information includes latitude and longitude, given in terms of degrees, minutes and direction. The degree number for latitude ranges between 0 and 90 and the degree number for longitude ranges between 0 and 180. The minutes number range for both is between 0 and 99,999. The direction symbols for latitude are N for North, S for South and for longitude are E for East and W for West. The sentence format for latitude and longitude is DD.MMMMM,d. With the first sequence DD.MMMMM,d being degrees "DD", minutes "MMMMM", and direction "d" of latitude. The second sequence DDD.MMMMM,d being degrees "DDD", minutes "MMMMM", and direction of longitude "d". The microprocessor determines the degrees, minutes and direction for both latitude and longitude based on the coordinates entered directly by the user or by a location selected by the user using the LCD display.

The waypoint name format may be up to 10 ascii text characters, such as "redcanyon" or any name desired by the user. For example, the user may choose a name based on the name of land feature or location, i.e. "red canyon" or a name that indicates which users should meet at the waypoint, i.e. "group1" or a name that indicates the time when he passed through the coordinates, i.e. "9 am".

After the waypoint name is the ICON data field. The ICON data field includes the waypoint ICON index and may be displayed as a hex value. The ICON data field contains a reference to the waypoint ICON. For example, when the user marks a waypoint, in addition to selecting a name or number for the waypoint, the unit also allows a user to select a certain icon or graphic. For instance, with a search and rescue mission, a user may mark a certain waypoint with a "body" icon illustrating that he has found a person's body at that location. The ICON data field transmits the selected graphic reference number to the receiver such that the may then display the correct graphic along with the waypoint name. The ICON index is a reference to the graphic and the graphic many not actually be transmitted, only its reference number.

Following the ICON sentence data, is an altitude data field. The altitude is a numerical measurement reading of the altitude of the GPS unit. The altitude measurement is the altitude of the waypoint location being transmitted. In one embodiment, the altitude value may range between −250 and +1250 meters. However, the numerical reading may be feet, yards, miles or any other length or height unit. The large numerical range available allows a unit to display an altitude, even if the location is underground, such as a cave or below sea level. The altitude of the waypoint is determined by the microprocessor based on an analysis of the satellite positional signals received by the GPS receiver.

A SCODE data field is included after the altitude data field. The SCODE is a unique identifier represented in hex. This identifier is unique for every GPS unit and enables a user to query or transmit information to a specific unit, without sending the data to all groups. The SCODE data field is populated with a serial code 24 bit hex value with a range of 000001 to FFFFFF hex. This number indicated to the receiver the unit which send the sentence and additionally where to send reply information.

A group identification data field allows the unit transmitting a waypoint to indicate which users the waypoint is meant for. The group identification number may range between 01 to 99. Additionally, the data field may be populated by text characters or by a combination of text and numerical characters. For example, if the group name is "A2" the group identification number included in the NMEA sentence would be "A2". For example in a search and rescue operation there may be one group (group 01) consisting of several members looking for the missing person and another group (group 02) consisting of several medical personnel to assist either the search members or the missing person when he is located. The group identification allows for all users to know which waypoints are directed to them and which waypoints are directed to other users. In the search and rescue mission the medical personnel may transmit the location of the nearest hospital and the search members will be know that the waypoint indicating the hospital is directed only to the medical personnel and not the search members. However, there may be instances where all users need to know a certain location. In this case the group identification transmitted will be 00. For example, if the search and rescue members find the missing person the location will be transmitted too all members with the information that it is directed towards every group member.

Following the group identification data field, are the date and time fields. The data and time data fields are numerical values that indicate the time and date that the waypoint was selected and transmitted by the user. The date format is "yymmdd", with yy indicating the year, mm indicating the month and dd indicating the day. The year number "yy" may range between 00 and 99, for example for the year 2009 the value would be "09". The month number is between 01 and 12, with January represented by 01. For example, if the month is May the month will be "05". The day "dd" ranges from 01 to 31 and represents the day in the month. For example, the 14$^{th}$ of May would be "14". The full date format for May 14, 2009 would be, "090514". The time format is "HHMMSS", with HH indicating the hour, MM indicating the minutes and SS indicating the seconds. The hour number HH ranges between 00 and 24, for example 7:00 a.m. would be "07" and 3:00 p.m. would be "15". The minutes number MM ranges between 00 and 59, for example 15 minutes after the hour would be "15". The second number SS ranges between 00 and 59, for example, 30 seconds after the minute would be "30".

Finally, the first sentence ends with an asterisk "*" followed by the checksum digit and the carriage return, line feed. As discussed above, this indicates the end of the sentence and allows the receiver to verify the accuracy of the information received in the first sentence.

A specific example of the first NMEA sentence transmitting a waypoint location named "redcanyon" at 6:43 a.m. on Jan. 28, 2008 with a group identification of 01 would be: $GPWPL,25.12345,N,121.12345,E,redcanyon, 06,100,000001,01,080128, 064300*CC<CR><LF>. After the dollar sign and transmission type the first three data fields represents the latitude information. The 25 is the degrees, 12345 is the minutes and the direction is North, so the latitude is 25.12345 degrees North. The next three data fields represent the longitude information. The 121 is the degrees, 12345 is the minutes and E is direction East, so the longitude information is 121.12345 degrees East. The next data field is the waypoint name, red canyon. This is followed by the ICON index number, 06 representing the reference graphic number 6 of the graphic illustrations available to illustrate a waypoint on each unit. The next data field is the altitude and indicates that the unit is at a height of 100 meters. This is followed by the SCODE 000001 which indicates the unit identification of the user sending the waypoint, the unit hardware is 000001 indicating unit 1. The group identification number is 01 and the date is Jan. 28, 2008 represented by 080128 and the time the sentence was transmitted was 6:43 a.m., represented by 064300.

The first NMEA sentence may be used to transmit waypoints to different users allowing for easy and more efficient communication of location data. For example, if a search and rescue team is attempting to locate a missing team member, each member of the search and rescue team can transmit the locations that they have searched. Also, members can transmit to other members the locations of places of interest, such as the place where the missing person's backpack, cup or other personal belonging was found. For example, in the specific sentence discussed above, a user sent a waypoint called red canyon to all other members. The sentence transmitted the exact coordinates of the location and the time that the waypoint was set. This allows members to know the exact location and name of the area or place the user or team member wanted to illustrate. Additionally, because the date and time are transmitted along with the waypoint information, other members and users will know if this is a new waypoint or what time a member passed through this location. This function helps the search and rescue members to more efficiently canvas an area and be able to narrow the search accurately by marking specific locations and more quickly locate the missing person.

The format for the second sentence may be, $GPWMS, <Message>,<NameId>, <SCODE>,<GroupID>,<Status>, <ICON>*<CKSUM><CR><LF>. The second NMEA sentence includes a series of data fields pertaining to the type of transmission, text message, name identification of the user, transmitted SCODE, group identification, status, ICON, checksum and sentence termination delimiter, each of which are discussed in turn. First, the beginning of the second NMEA sentence, starts with a $. As discussed above, this alerts the receiver to the beginning of the sentence. A transmission type of the sentence is represented by "GPWMS" which indicates that the sentence is a text message intended for a GPS receiver. For example, the "GP" indicates to the receiver that the sentence that it is designated for a GPS receiver, the "WMS" indicates that the following data is a text message.

The text message data field follows the transmission type data field. The text message field allows for 39 characters of ascii text. These characters are selected by the user using the LCD screen and joystick. The text message allows for users to communicate to each other without having to speak. The actual message may be any combination of characters the user chooses. The name identification follows the text message data field. The name identification provides the user's name who is sending the text message. The name of the user may be selected by the user composing the text message or may be populated automatically by the microprocessor, using the memory settings including the unit identification. The name of the user includes up to 10 text characters of ascii code.

The SCODE and group identification data fields follow the name identification data field. The SCODE and group identification fields are the same format and include the same types of information as the first NMEA sentence. See above for a more complete description of their formats.

A status data field follows the group identification. The status field includes a hex numeral and ranges between 00 and FF hex. Bit 0 represents that the status GPS is valid. If the status of the GPS is valid then the receiver will know that the location data and waypoint information is accurate. However, if the status display illustrates that the GPS is not accurate the receiving user will understand the position information is approximate. For example, in an open area, typically the GPS receiver will be able to receive positional signals from three satellites, which insures that the position information is accurate. However, in certain conditions, such as in a forest or cave, the GPS receiver many not be able to receive as many positional signals. The data for the waypoint and other position information must then be calculated by the microprocessor. The status data field allows the receiver user to know if the waypoint location is accurate or an estimate performed by the GPS microprocessor.

A ICON data field is after the status, the ICON number ranges between 00 and 99. The ICON number is a reference to a particular graphic illustration stored in the memory of each GPS unit. The icons stored may be changed, added or removed as desired by different users. The ICONS data field includes the reference number of the icon graphic included with the text message sent by the transmitter. Similar to the waypoint ICON index, the ICON number data field allows the receiving unit to correctly display the correct icon selected by the transmitting user.

Finally, the first sentence ends with an asterisk "*" followed by the checksum digit and the carriage return, line feed. As discussed above, this indicates the end of the sentence and allow the receiver to verify the accuracy of the information received in the second sentence.

A specific example of the second sentence, in which a text message sent from peter586 saying "Hello World" transmitted would be: $GPWMS,Hello World,peter586,000010,02, 01,00*<CKSUM><CR><LF>. After the dollar sign and transmission type, the next data field is the text message. This message included "Hello World". The data field following the text message is the user name, peter586. The next data field is the SCODE 000010, which indicates that the unit sending the information is unit number 10. The group identification is next and indicates that the group id is 02. The status data field is 01 indicating that the status for the GPS fix is valid. Finally, the ICON data field is 00 indicating that reference graphic 00 has been selected by the transmitting user. The second NMEA sentence allows for users to communicate without speech and without making too much noise. For example, if a military soldier is in enemy territory he can transmit messages, such as "need medical attention" or "enemy planning an attack for 1 am" to other users or soldiers without being heard or detected by the enemy. Additionally the second sentence allows for users to transmit messages to all other users simultaneously. This may be more effective then attempting to communicate using audio to each member. For example, search and rescue teams can transmit information to all members simultaneously through a single message saving the time it would take to alert each individual separately.

The format for the third sentence may be:$GPWGT,<Fix-Status>,DD.MMMMM,d,DDD.MMMMM,d,<Altitude>, <COURSES>,<SPEED>,<NameId>,<SCODE>, <GroupId>,<Status>,<ICON>,<Date>,<Time>*CC<CR><LF>. The third NMEA sentence includes a series of data fields pertaining to the type of transmission, GPS fix, location information, altitude, course, speed, name identification, SCODE, group identification, status, date, time, checksum and sentence termination delimiter, each of which are discussed in turn. First, the beginning of the third NMEA sentence, similar to the first and second sentences starts with a $. As discussed above, this alerts the receiver to the beginning of the third sentence. A transmission type of the sentence is represented by "GPWGT" which indicates that the sentence is user travel information intended for a GPS receiver. For example, the "GP" indicates to the receiver that the sentence that it is designated for a GPS receiver, and the "WGT" indicates that the following data is information related to travel, speed and distance of a unit.

A fix status data field indicates whether there is a valid GPS status fix, i.e. whether the GPS receiver has been able to locate the current GPS position accurately. For example, if the GPS receiver is able to receive position signals from more than one satellite it can determine the position accurately, but if cannot receive signals from more than one satellite it will not be able to accurately determine the position. The fix status is a text character and may be "A" representing a valid GPS fix or "V" representing an invalid GPS and no fix. This allows the unit to know whether the location data included within the NMEA sentence is accurate, or whether the location information may be inaccurate.

A location information data field includes a set of coordinates that defines the specific location of the unit at the time the NMEA sentence was transmitted. The location information includes latitude and longitude, given in terms of degrees, minutes and direction. The degree number for latitude ranges between 0 and 90 and the degree number for longitude ranges between 0 and 180. The minutes number range for both is between 0 and 99,999. The direction symbols for latitude are N for North, S for South and for longitude are E for East and W for West. The sentence format for latitude and longitude is DD.MMMMM,d. With the first sequence DD.MMMMM,d being degrees "DD", minutes "MMMMM", and direction "d" of latitude. The second sequence DDD.MMMMM,d being degrees "DDD", minutes "MMMMM", and direction of longitude "d". The microprocessor determines the degrees, minutes and direction for both latitude and longitude based on the current location of the unit calculated by the GPS receiver.

Following the location data, is an altitude data field. The altitude is a data format providing a numerical reading of the altitude of the GPS unit, determining the current height of the unit. In one embodiment, the altitude value may range between −250 and +1250 meters. However, the numerical reading may be feet, yards, miles or any other length or height unit. The large range available allows a unit to display an altitude even if the location is underground, such as a cave or below sea level.

A courses data field follows the altitude data field. The courses number ranges between 000 and 359 and represents the degrees of the current heading of the unit. For example, if a user is heading 90 degrees towards the Northeast, the course number stored and transmitted will be 90 degrees. This course information allows the user receiving the NMEA sentence to better predict future locations of the user sending the information. For example, using the course information received along with the last position, a user may point to the current location on a map and then use the travel course to extrapolate the next location of the transmitting unit.

A speed data field is located after the course data field. The speed indicates the current speed of the unit when the NMEA sentence was transmitted. The format for the speed ranges between 0 and 999 kilometers per hour. However, the speed may be formatted to be miles per hour or any other speed unit measurement. The speed data allows a user to know how fast another user is traveling. Also, the measurement allows the unit to better predict when another unit will reach a certain destination. For example, similar to the manner in which a user may determine a future location of a particular user using the course information, the microprocessor can determine when a certain unit will reach a destination. Based on the current location, course and speed as well as distance to a particular location the microprocessor can calculate the estimated time of arrival of the transmitting unit to that location.

A name identification data field follows the speed data field. The name identification provides the name of the user whose information is being transmitted. The name of the user may be selected by the user sending the information, or may be populated automatically by the microprocessor, using the memory settings including the unit identification. The name of the user includes up to 10 text characters of ascii code.

A SCODE data field is included after the name identification data field. The SCODE is the unit identification number of the GPS unit transmitting its information. The SCODE is the same format and include the same types of information as the first NMEA sentence. See above for a more complete description of its format.

A group identification data field is included and allows the unit transmitting the travel information to indicate to which group the user sending the information belongs. The group identification number may range between 01 to 99. Additionally, the data field may be populated by text characters or by a combination of text and numerical characters. For example, if the group name is "A2" the group identification number included in the NMEA sentence would be "A2". The group identification number is the same format and includes the same information as the first NMEA sentence. See above for a more complete description of its format.

A status data field follows the group identification. The status field includes a hex numeral and ranges between 00 and FF hex. Bit 0 represents that the status GPS is valid. The status data field is the same format and information as the first NMEA sentence. See above for a more complete description of its format.

A ICON data field is after the status, the ICON number ranges between 00 and 99. The ICON data field is the same information and format as the second NMEA sentence. See above for a more complete description of its format.

Following the ICON data field, are the date and time fields. The date and time data fields are numerical values that indicate the time and date that the travel information was transmitted by the user. The date format is "yymmdd", with yy indicating the year, mm indicating the month and dd indicating the day. The year number "yy" may range between 00 and 99, for example for the year 2009 the value would be "09". The month number ranges between 01 and 12, with January represented by 01. For example, if the month is May the month number will be "05". The day "dd" ranges from 01 to 31 and represents the day in the month. For example, the 14$^{th}$ of May would be "14". The full date format for May 14, 2009 would be, "090514". The time format is "HHMMSS", with HH indicating the hour, MM indicating the minutes and SS indicating the seconds. The time format is the time that the travel information was collected and transmitted. The hour number HH ranges between 00 and 24, for example 7:00 a.m. would be "07" and 3:00 p.m. would be "15". The minutes number MM ranges between 00 and 59, for example 15 minutes after the hour would be "15". The second number SS ranges between 00 and 59, for example, 30 seconds after the minute would be "30".

Finally, the third sentence ends with an asterisk "*" followed by the checksum digit and the carriage return, line feed. As discussed above, this indicates the end of the sentence and allow the receiver to verify the accuracy of the information received in the third sentence.

A specific example of the third sentence, sent from Joe at 6:36 a.m. on Jan. 28, 2008 with a speed of 25 km/hr and a course of 359° would be: $GPWGT, A, 25.12345,N, 121.12345,E,100,359,25,Joe, 000001,01,01,01,080128, 063600*CC<CR><LF>. After the dollar sign and transmission type the first data field represents the fix status and A is displayed representing that there is a valid GPS satellite fix. After the fix status, the next three data fields represents the latitude information. The 25 is the degrees, 12345 is the minutes and the direction is North, so the latitude is 25.12345 degrees North. The next three data fields represent the longitude information. The 121 is the degrees, 12345 is the minutes and E is direction East, so the longitude information is 121.12345 degrees East. The next data field is the altitude and indicates that the unit is at a height of 100 meters. The data fields following altitude are the course information, speed and name identification, 359 indicating that the unit is on a course of 359 degrees and 25 indicating that the user is traveling at 25 km/hr and the user is Joe. These data fields are followed by the SCODE 000001 and ICON 01 indicating that unit 1 is sending the positional information and that the user has included graphic reference number 1 along with his location. The group identification number is after the ICON field and is 01. Also the status is 01, indicating that the GPS has a valid status fix. The next fields are the date and time, 080128 indicating that the sentence was sent on Jan. 28, 2008 and 063600 at 6:36 a.m. The third sentence allows the unit to compute for different users their estimated time of arrival to a particular location, future destinations as well as display each user's current path, speed, heading and current location. For example, in a search and rescue operation, members of the team will be able to determine how quickly other members can reach them if they find the missing person or if they themselves become endangered. Additionally, the third sentence allows for the team to estimate how quickly they will be able to canvas an entire area and track each member's progress and travel information.

The microprocessor 302 outputs a variety of signals to the radio interface 111. In one embodiment, all data other than voice communications, is transmitted from the GPS unit 101 in the form of NMEA sentences. If the communication device is analog, the data is sent at the end of the voice communication when the PTT button is released. After the PTT is released, the unit automatically generates and transmits a fast frequency shift keying (FFSK) audible burst. The FFSK encodes the NMEA sentences into a format that is easily transmitted over radio waves. For example, the NMEA sentence is encoded to a series of bits which is then transformed into high and low frequency radio waves. The receiver at the end then decodes the varying frequency waves into a series of bits which is then transformed into the original NMEA sentence. The communication device is digital, the modem sends data over the data channel of the radio after the PTT has been released.

Similar to the two-way radio function, a cell phone may also transmit the FFSK audible burst including the NMEA sentences. The user uses his cell phone to dial another phone and after connected presses the PTT button on the unit. When the button is released the FFSK audible burst is transmitted through the cell phone to the cellular network. The FFSK is then decoded, either by a GPS unit coupled with a receiving cell phone or directly by the other cell phone should the cell phone be configured in accordance with aspects of this disclosure, when it is received. A user may also use a cell phone with a digital modem connecting the device to the data port of the digital cell phone and use the digital data modem portion to send and receive information between two units. Additionally, the user may be able to communicate and send data between more units if a telephone conference option or 3-way calling is provided by the cellular network provider.

The microprocessor 302 may produce a number of output signals, including an FFSK encoded audio signal, which may include one or more of the above-referenced NMEA sentences, voice, a PTT output that triggers the associated PTT functionality on the attached two way radio. The microprocessor may further include a serial data port interface 307 and a USB port interface 307. The input and output configurations provide the GPS unit a variety of different methods for data transmission. For example, the FFSK is used for radio wave transmission, the serial data port and USB port allow for digital transmission. The type of signals actually used by the communication device 100 depend on the type of device. If the communication device is an analog radio or data transmission over audio (such as a cell phone) then the output data signal will be an FFSK burst after the voice transmission. If the communication device is a digital radio then output data is sent through the digital modem of the device. For example, if the communication device 100 has a digital transmission mode then the FFSK audio signal would be ignored.

The microprocessor 302 of the GPS unit 101 receives a number of input signals from the communication device 100. The microprocessor 302 processes the input signals and provides the signals to one of several possible connected functional processing elements. For example, when the device receives a FFSK signal and an audio signal from the communication device 100, the signal is processed encoder/decoder 406, which decodes it and sends it to the microprocessor 302. The microprocessor also sends the audio signal to the speaker 203 and stores any other data included within the signal in the memory 304 and/or displays it on the LCD 202. Similarly, the microprocessor may receive voice data from the microphone input 210, which voice data is subsequently processed by the encoder 306 and transmitted to another device by way of a two way radio coupled with the GPS unit, for example. However, the signal inputs and outputs of the microprocessor 302 may include more or fewer signals than discussed. The signals depend on the functions of the GPS unit 101, for instance, the compass 301 may be omitted from the unit 101 and therefore the microprocessor would not receive a compass input. Additionally, more functions may be added, such as camera and then the microprocessor would then also include a signal to and from the camera.

The microprocessor 302 stores information it receives in the memory 304 and performs calculations and executes various other actions based, at least in part, on the stored information. For example, the microprocessor 302 receives data from the GPS receiver 201 and compass 301. The data is processed and the received information is stored in the memory 304. Hence, the processor may store in memory latitude and longitude information, a time and date stamp, along with heading information from the compass. Calculations may then be performed by the microprocessor 302 with the data inputs being time, date, latitude, longitude, user speed and direction and altitude.

Additionally, when the communication device 100 receives a radio transmission, the encoder 306 provides the data to the microprocessor 302. The microprocessor 302 then stores the data, such as text messages, along with the group and unit identification numbers of the transmission, the location, speed, direction of travel, and altitude of the transmitting device as well as showing on the receiving party's LCD screen that a transmission has been received by an individual as well as their location. Various methods performed by the microprocessor 302 using information stored within in the memory 304 may provide information sufficient to display on the LCD 202 position, bearing, speed, etc., information for the device as well as position, bearing, speed, etc., information received from other devices. The data in memory may also be used by the processor to plot a course to a target location (entered by the user, or determined from other user data), estimate time of travel to the target location or another location and send messages to other users.

The compass 301 is a computing module, implemented in hardware, software, and/or firmware, that provides the directional bearing of the GPS unit 101. It should be noted, that various modules illustrated in FIG. 3 may be implemented in hardware, software, and/or firmware. The compass module is coupled with the microprocessor. The compass module may also be connected with the GPS receiver directly, or be configured to obtain positional information from the microprocessor 301. The microprocessor receives the directional bearing information from the compass and displays the bearing information on the LCD screen 202 when the user selects the compass function, such user selection being discussed in further detail below. The compass 301 in one embodiment is an electronic compass with magnetic sensors that provide geomagnetic data to the microprocessor 302 in order to determine the unit's bearing. In one embodiment, the compass is the TOSHIBA YAS525B electronic compass. However, the compass 301 may be any device capable of determining the directional heading of a device and is not constricted to only electronic devices. For example, the compass 301 may comprise a manual magnetized needle compass with a display next to the LCD screen 202.

The memory 304 stores and provides access to all types of data for the GPS unit 101. The memory may be any type of memory such as volatile or nonvolatile memory and may have any size storage. In one embodiment, the memory 304 is nonvolatile solid state memory. The memory 304 communicates with the microprocessor 402 to receive data and provides data to the microprocessor to be transmitted or displayed. The memory 304 stores the user's identification name, group name as well as a hardware identification. The user identification and group name may be changed by the user, however the hardware identification is specific to that GPS unit and acts as a serial number for the unit and may be set to not be able to be modified by the user. Some or all of the data stored in the memory 304 may be able to be downloaded to a computing device, such as a personal computer, personal digital assistant, another radio, a removable memory device (e.g., a jump drive coupled with the USB port), etc. or other external storage. The user may choose to download the entire memory or only selections of the memory. Memory capacity may be managed on a first in first out basis, as well as in other ways.

The battery 309 provides power to the internal circuitry 300 and the GPS unit 101. The GPS unit 101 may operate without the battery, for example it may include a power cord or other type of power source. Additionally the battery 309 may be rechargeable or replaceable and may be any type of battery such as nickel-cadmium, nickel-metal hydride, lithium ion, polymer, alkaline or lead-acid. The battery may connect internally inside the casing 211 of the GPS unit 101 or may connect to the outside of the GPS unit 101. For example, a battery clamshell may be used allowing the GPS unit 101 to run on an internal battery 309 as well as disposable external batteries. In addition to the battery 309, the internal circuitry 400 includes a power supply charger 308. The power supply charger 308 may recharge the battery or provide power itself to the GPS unit 101. The power supply charger 308 may provide power to the battery 309 or the unit 101 from any source. For instance, the charger 308 may be connected to a power outlet, an external battery, computer or to the power source of the communication device 100. The power charger 308 may be connected to the power source through any type of cable, such as a USB cable or charging cable. In one embodiment, the power charger 308 connects to a power source through a USB five volt connection cable. In another embodiment, the GPS unit 101 may be connected to the communication device's auxiliary power connection. This allows the battery 309 to be recharged and additionally provides power to the GPS unit 101. This helps to give the GPS unit 101 additionally battery life and thus more time in the field.

The encoder/decoder 306 encodes and decodes radio analog signals sent and received by the GPS unit 101. The encoder/decoder may be any device or electronic circuit able to change an electronic signal into a code and when receiving a coded signal can return it to its original form. In one embodiment, the encoder/decoder 406 is a fast frequency shift keying (FFSK) encoder/decoder, which encodes binary 0s and 1s into different frequency cycles. For instance, if the data format is FFSK the encoder translates the signal into the correct format and then sends the newly formatted signal to the microprocessor 302 to be sent to the communication device 100 via the connection port 111.

In another embodiment, when the data format is a digital signal, the encoder and decoder encodes the electronics signal into a format able to be transmitted by the transmitting modem. For example, the encoder translates the information into a series of audio signals which are then able to be transmitted by the modem. When the unit receives a coded signal the encoder/decoder decodes the data by translating it from a series of audio signals back into 0s and 1s. After the data signal is encoded for transmission it may be encrypted. If it is a digital signal it may be encrypted through the data port, and if it is FFSK format it may be encrypted by a scrambler. In both cases, the encryption device may or may not be an internal component of the two way transceiver and may be external. The data port and scrambler may be located in the GPS unit 101 or within the communication device 100, and may be any device capable of encrypting a signal. For example, an encryption circuit may be implemented within the internal circuitry 300 of the GPS unit 101 or may be integrated within the communication device 100. Encrypting the signal before transmission allows for sensitive data to be transmitted between GPS units 101.

The USB UART 307 provides connectivity options for different data formats. In one embodiment, the USB UART signal 207 allows data signals to be sent both through a USB output and a serial data output. This allows the GPS unit 101 to connect to any type of communication device. Also, the signal may be modified to be able to connect to any other data format, further increasing the flexibility of the GPS unit 101.

Figure 4:
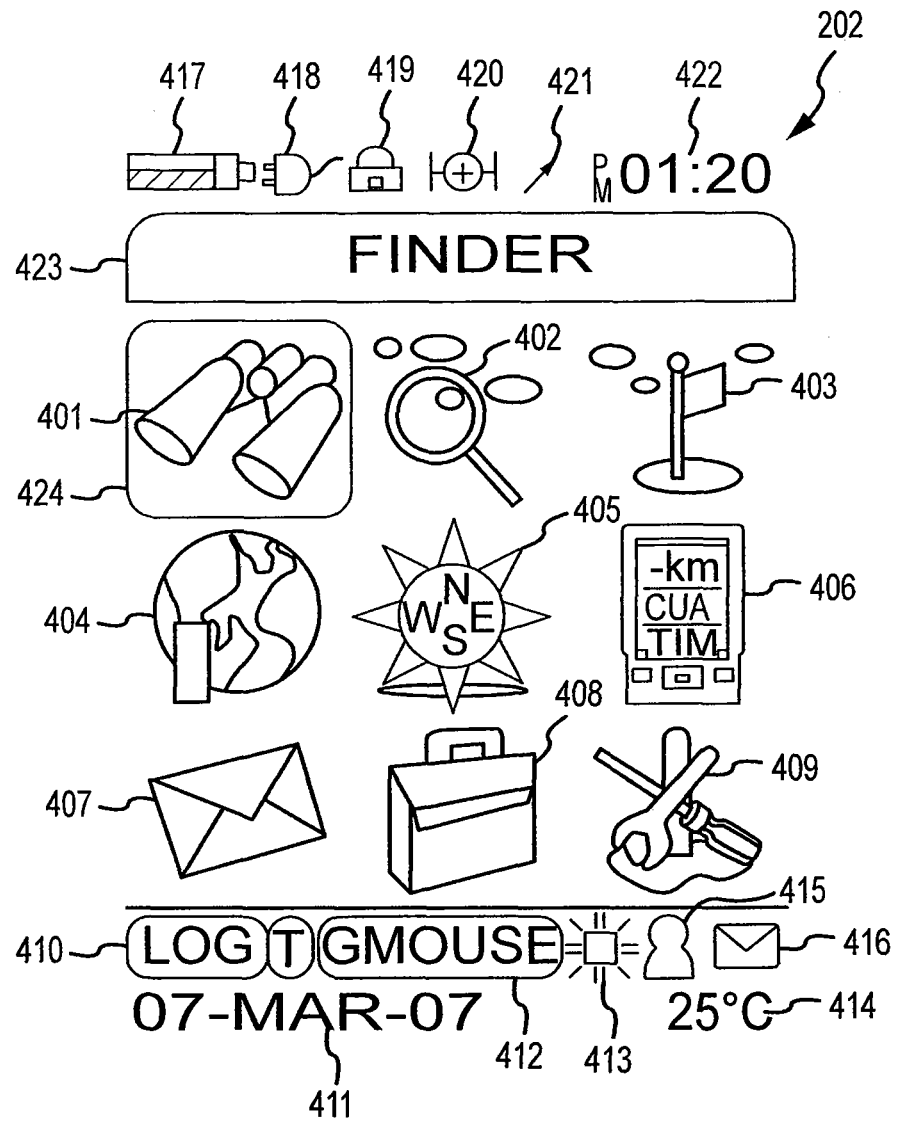
FIG. 4 illustrates a LCD main menu displayed as on the LCD screen of the GPS unit.

FIG. 4 illustrates the main menu screen illustrated on the LCD 202 display. The icons and functionality accessed by way of the icons are illustrative of some of the device functionality that is provided by various aspects of the present disclosure. The display options and icons are driven by the microprocessor 302 as discussed above. The main screen displays a number of informational and functional icons. First beginning with the informational icons, in one embodiment, each informational icon is representative of some operational aspect of the unit 100. Further, the informational icons display data continuously and the user does not need to go through a menu hierarchy in order to receive information. The informational icons may include a battery power indicator 417, power source indicator 418, keypad lock 419, GPS status 420, data TX/RX 421, time 422, log enable 410, G-mouse/NMEA data out 412, backlight status 413, group people 415, message 416, date 411 and temperature 414. The informational icons may alter in appearance or may not be present, depending on the status of the information that they are designed to indicate. For example, if the user has not received any messages, the message icon 416 is not displayed on the LCD screen 202. Additionally, the informational icons may be designed as any suitable display graphic, may be located anywhere on the LCD screen 202 or may be partially or completely omitted. Furthermore, the user may select which icons he wishes to have displayed on the screen 202 by selecting the tools icon.

A battery power indicator 417 illustrates the power level of the battery. In one embodiment the power is indicated by a graphic of a battery that progressively becomes "empty" as the power level decreases. For example, when the battery is fully charged the graphic display is filled in entirely, when the power level has been decreased by 20% the battery graphic is filled only to 80%. However, the battery power indicator 417 may be designed to have any appearance, for instance it may simply display the numerical percentage of power, may include bars that decrease or any other graphic able to inform the user of the amount of power remaining in the battery.

A power source indicator 418 illustrates the power source providing power to the GPS unit 101. The GPS unit 101 may provide its own power through the battery, or may receive power from an external connection. For example, the communication device 100 or an external battery may provide power to the unit 101. In one embodiment, the power source indicator 418 is a graphic design of a power-plug, however it may be designed in any suitable graphic. The power source indicator 418 is illuminated if the GPS unit 101 is receiving power from the communication device 100, or another source of external power such as an electrical cord.

A GPS status icon 420 illustrates to the user the satellite fix of the GPS receiver 201. In one embodiment, there are four graphics, the first illustrates a two-dimensional fix (i.e. two satellite signals are within range), the second is a three-dimensional fix (i.e. three satellite signals are within range), the third represents when the GPS receiver 201 is unable to locate any satellite signals and the fourth represents when the GPS is disabled, for example, when the GPS receiver 201 is disabled or otherwise un-operational. The four graphics in one embodiment, are represented by a basic graphic of a satellite, a circle with two vertical bars attached to the sides of it. When the receiver 201 is unable to fix on any satellites or less than two satellites the circle is unfilled. When there is a two-dimensional fix the circle is partially filled, with a three-dimensional fix the circle is filled in more completely. When the GPS receiver 201 is disabled, the circle has a "X" through it. However, the type of graphical display is unrelated to the function and the graphics may be designed in any manner able to communicate to the user the GPS satellite signal information.

A keypad lock icon 419 indicates if the keypad and joystick 207 have been locked. If the joystick and keypad are locked the user will not be able to select any functions or activate any features. This feature is activated when the user holds the cancel button 208 for longer than two seconds. As discussed above, this insures that the GPS unit 101 will not access any functions or send any information if the user accidentally brushes against a button, or the joystick. The keypad lock 419 is a graphic of a padlock with a keyhole, however the graphic may be any suitable design. Additionally, the keypad lock icon 419 is not vital to functionality and is merely a convenience to the user and may be omitted from the LCD screen display 202.

A data TX/RX icon 421 indicates whether the device is transmitting or receiving NMEA data stings. Also, this icon may be used as a troubleshooting tool. For instance, if the unit is not displaying data for any other units, the user may see if it is actually receiving the NMEA sentences and not processing it correctly or whether the unit is outside of the range of the communication device. The graphic for the data TX/RX icon is a upwards slanted arrow, but may be designed in any manner.

A time icon 422, in one embodiment illustrates the current time in minutes and hours and additionally whether it is after-noon (p.m.) or before noon (a.m.). However, the time icon 422 may be designed to reflect the current time in military format, therefore without a.m. or p.m. displayed, or as an analog clock graphic. Similar to the other informational icons, the time icon 422 may be omitted from display or may be located anywhere on the LCD display 202.

A Log icon 410 indicates to the user that the system is logging all activities; power on, power tuned off, etc. The log icon serves as an operational and diagnostic tool by allowing the user to view all the recent activities of the GPS.

A G-mouse 412 icon appears when the unit is connected to either a serial or USB port and is being communicated to by appropriate software. This allows the user to know whether he has correctly connected the GPS unit to an external USB connection or serial port and whether it is transmitting and receiving information via the connection.

A backlight indicator icon 413 reflects whether the backlight of the LCD is on. This is important when the user may have selected the backlight to stay on all the time, which increases power consumption (decreasing operational time of the unit) and where during daytime operations it would be difficult to see whether the backlight is in fact lit. The backlight icon 413 is represented as a square with radiating lines and is located in the lower corner of the LCD display 202. However, it may be designed as any graphic and may be positioned anywhere on the display 202 or may be omitted.

A group people icon 415 allows one to select between various groups and then either all or one individual in this group. Once a group or individual has been selected, the user may then choose to have the unit display that group or individual's travel information, such as speed, location, course, altitude, etc. The group people icon 415 is a graphic of the outline of a person's head and shoulders and is located next to the message icon 416 and the backlight icon. However, it may be designed as an graphical illustration and may be positioned anywhere on the display 202 or may be omitted.

A message icon 416 reflects whether the user has received any new messages. The message icon 416 is designed as an envelope, but may be any illustrative graphic. In one embodiment, when the user does not have any new messages the messages icon 416 is not displayed. However, the icon 416 may be designed such that when there are no new messages the graphic depicts an open envelope or other illustrative design.

A date icon 411 and temperature icon 414 indicate the current date and temperature. The date 411 is represented as a numerical-alpha combination, but could be represented as purely a numerical display. Additionally, the temperature is represented by a numerical graphic, but could be represented by any type of graphic such as a thermometer. Also, the temperature icon 414 includes a degree symbol "*" indicating that the number represents the temperature. The temperature icon 314 may also include the units of the numeric reading, the units represented may be Fahrenheit, Celsius or Kelvin, represented by "F", "C" and "K", respectively.

The functional icons are similar to the informational icons, but in one embodiment the functional icons are present on the main menu screen and their appearance does not depend on the status of the information that they reflect. The functional icons allow a user to select certain functions of the GPS unit 101. Each functional icon leads the user to a menu hierarchy listing different options.

Figure 4A:
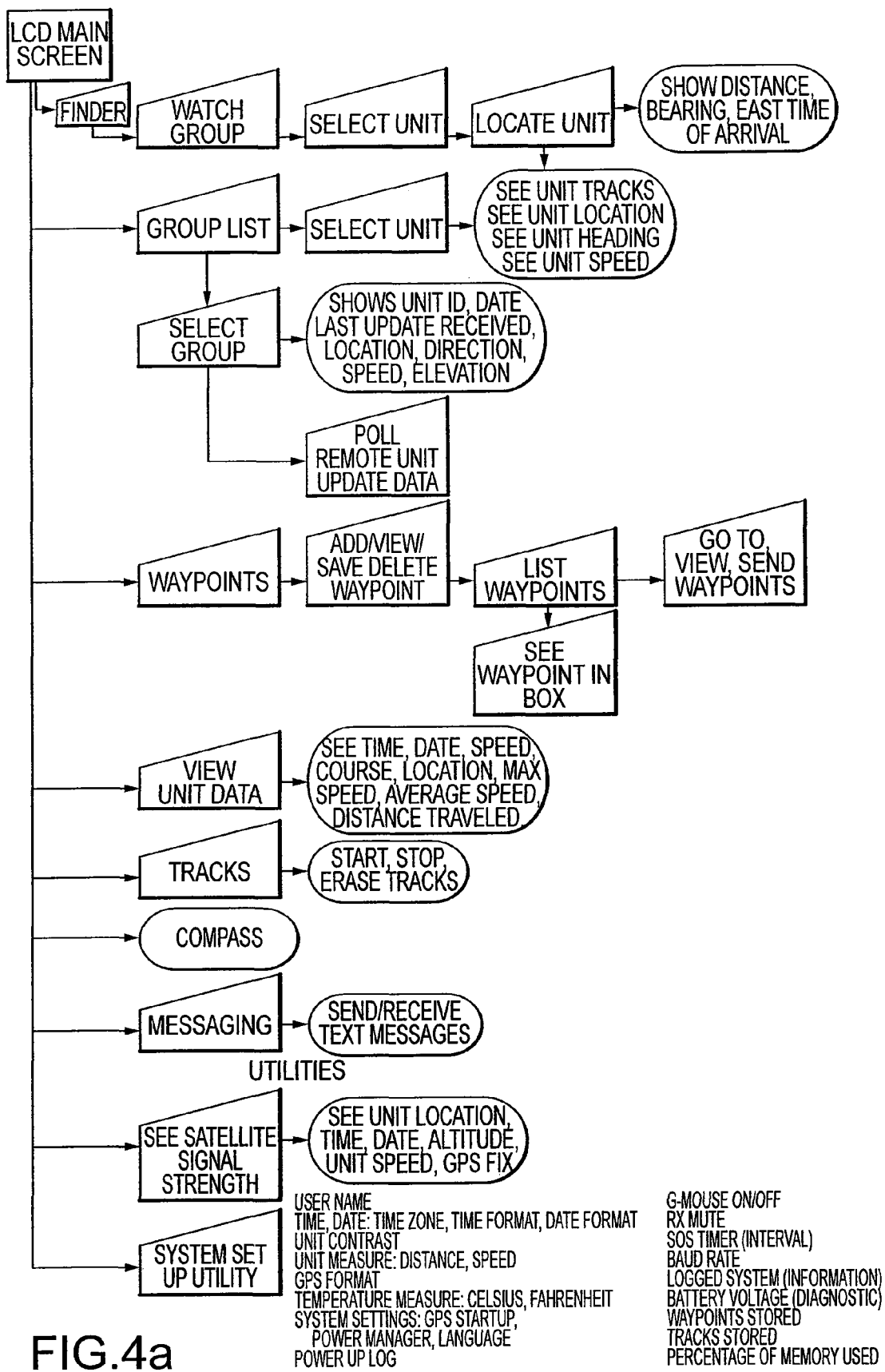
FIG. 4a illustrates a flow chart of a menu hierarchy of the main menu of FIG. 4.

FIG. 4a illustrates the menu hierarchy under the main menu shown in FIG. 4, and the functionality available to the user under each icon. The functional icons may include a finder 401, tracks 402, waypoints 403, GPS data 404, compass 405, unit data 406, messaging 407, extras 408, tools icon 409, selection tool (cursor) 424 and a header 423. The header 423 displays the name of each icon as the icon is highlighted by the user. Similar to the informational icons, the functional icons may be represented by any graphical design and may be positioned on any location of the LCD display 202. Additionally, one or more functional icons may be omitted or more added, depending on the desired functionality. Furthermore, the functional icons may be hidden from the main screen and accessed through other icons or options on the screen.

A finder icon 401 causes the device to display the travel information of a group of units and/or a particular unit When the user selects the finder icon 401, he is given a number of options, such as locating a particular unit within a group, as well as changing the group his unit is currently a member of. The first option displays all members within group, and their relationship with the unit and group. The next information displayed is the information for a particular unit. To display this information, the user uses the joystick 207 to select the desired unit as discussed herein. Once a unit is selected the LCD 202 displays the selected unit's information, such as the time the last information from the selected unit was received, the course, group identification, user identification, temperature, speed, direction, altitude, location and relative relationship to the unit including the selected unit's distance and bearing with respect to the unit. Along with the selected unit's information, the unit displays more options allowing the user to plot a course towards unit, track the next location of the unit or calculate the estimated time of arrival to the unit. The information displayed is the result of calculations of the microprocessor 302, based on the receipt of one or more of the NMEA sentences from other devices. The finder icon 401 in one embodiment, is designed as a binoculars graphic. However, similar to the informational icons, the graphic display may be any designed suitable to convey the icon's function.

The finder icon 401 additionally allows a unit to query another unit's information. If a unit is queried it transmits the latest travel data to the querying unit. In order to select a particular unit, the user uses the joystick 207 to select the group the unit belongs to and then using the joystick, highlights the unit's identification number or user name. Once a unit or name has been selected the unit then displays a popup icon indicating that the user has selected a unit to be queried. Once the user has acknowledge the selection, the unit then sends out a query to the selected unit. The query is a hex command requesting the specified unit to transmit an updated position and other travel information.

A tracks icon 402 in one embodiment is illustrated as a magnifying glass, and the tracking function causes the unit to display different options such as starting, stopping or erasing a track. The user then may select the desired option and either start, stop or erase a track. The unit may store multiple paths traveled by the user. The tracking function saves the data points recorded by the GPS receiver 201 as the unit travels. In addition, the microprocessor calculates and the LCD displays the duration of the track, start and stop time, distance covered, maximum speed, average speed, number of waypoints stored and marked. The tracks may be saved via the internal circuitry of the GPS unit 101 and also be downloaded to a computer or other device along with other information, through a direct or wireless connection. When downloaded onto a computer, personal digital assistant or other device, mapping software may be used such that the user may see his path on any type of map. Also, the tracking information, including the text may be transmitted to other units.

A waypoints icon 403 causes the unit to display different options such add, view, save or delete waypoints as well as reading received waypoints, setting a course to a received waypoint, and sending stored user waypoints to other units. The waypoints icon 403 may be designed as any graphic, but in one embodiment is designed as a flag. The waypoints function causes the unit to display a map or coordinates, allowing a user to select each waypoint or meeting point for other users my manipulating the joystick. In addition to marking the coordinates of the waypoint, the unit allows a user to annotate the name and points of interest and assign to the waypoint an icon from a pre-stored symbol library stored in the unit's memory. The icons may be uploaded, changed, deleted and created as desired and may be any type of graphical illustration, such as a depiction of a tree, human body (for search and rescue), mountain, lake, etc.

To create a waypoint, the user moves the cursor to "add a waypoint", where he may correct the elevation, change the waypoint name, change the icon assigned to the waypoint and stores the waypoint onto the unit's memory. If a waypoint is to be set as a meeting point, the user simply accesses the same menu, selects from the stored waypoint list the waypoint that needs to be transmitted, and then sends it to the entire group or a particular unit of a selected group by using the joystick 207. Additionally, the user may select the view option, causing the unit to display other unit's waypoints that have been sent to it or delete previous waypoints. The waypoints function allows for users to more efficiently communicate meeting locations and may be used to more efficiently perform safety tasks. For example, users participating in search and rescue missions may easily inform the others of what areas they have searched and if there is anything interesting or helpful at certain locations.

A GPS information icon 404 in one embodiment is a graphic of a satellite revolving Earth. The GPS information function causes the unit to display its current location, time and date, travel speed and the GPS fix. The GPS fix displays on the unit whether there is a two or three dimensional satellite fix. The more satellites the GPS receiver 201 has a fix on the more accurate the location information will be, therefore the user may alter his position to receive a better fix. For example, if he is located under a tree or other obstruction the antenna may not be able to receive as many signals. The signal strength is detected by the GPS receiver 201 and is based on the strength of each satellite signal. Additionally, the satellite signal strength function allows a user to see if the unit has both WAAS and GPS satellite information, allowing him to estimate the precision of the location data provided by the GPS unit 101. The GPS information icon may be used prior to the start of a search and rescue operation to ensure that the unit is receiving satellite positional signals and thus GPS coordinates.

A compass icon 405, when selected causes the unit to display its current bearing and direction. The compass icon 405 in one embodiment is an illustration of an analog compass. The compass displayed on the LCD screen 202, once the user has selected the icon 405, includes a circle with North, South, West and East directions and an arrow that points towards the direction the GPS unit 101 is facing. The graphical display of the compass may be altered to any type of design, such that symbols such as NW, SE, etc. may represent to the user the direction of the GPS unit 101, or a more detailed display such as the actual number of degrees off North that the GPS unit 101 is facing. The direction of the arrow or the number of degrees displayed is determined by the microprocessor 302 based on the electronic signals sent from the compass 301. Additionally, the compass icon 405 displays a compass calibration option. If the user selects this option the unit will calibrate the compass by using a known reference location. A group list icon 406 is a graphic illustration of a GPS unit, and causes the unit to display options such as select a unit or group. If a specific unit is selected, the unit will display the unit's tracks, location, temperature, altitude, heading and speed. Additionally, the group list icon will display the relationship the unit has in terms of bearing and direction with the selected unit. If the user selects a group the unit displays the group's individual identification names, date the last update was received, and location, temperature, speed, direction, elevation of the group's units and its relationship to all units.

Additionally, the user may select to poll remote units to update data. This function operates in the same manner as a query and updates the group information displayed. The microprocessor sends a request, in the form of a hex command, to each unit via the communication device 100 asking the selected units to send their travel information. The hex command includes a "$" character indicating the beginning of the command. However, unlike the NMEA sentences it does not include a transmission type, but rather a string of hex digits.

The "$" character alerts the microprocessor that it is receiving a data string and the microprocessor then decodes the data following the dollar-sign character in a manner similar to the NMEA sentences, discussed above. Following the $ and hex digits is a carriage return and sentence delimiter. The carriage return and sentence delimiter indicate to the microprocessor the end of the hex command. The basic format of the hex command is: $<CMD></CMD><CR><LF>. The command data fields, <CMD> and </CMD> may include any number of hex digits and allows the unit to request data strings, in the form of NMEA sentences and other transmissions, from other units. The unit being queried, after receiving the request, in turn transmits the third NMEA sentence discussed above. The third NMEA sentence includes the unit's position, location, speed, altitude, and other travel information about the specific unit. Once the data is received the unit requesting the information stores it in its memory.

A unit data icon 406 shows the user his or her pertinent operational data. For example, the time and date, location, speed, course, maximum speed, average speed and distance traveled. The microprocessor calculates the maximum and average speed as well as the distanced traveled and this information along with the course and distance traveled is stored in the memory 304. The memory 304 stores each position calculated throughout the entire course, that information is then easily displayed to the user via the unit data function.

Figure 4B:
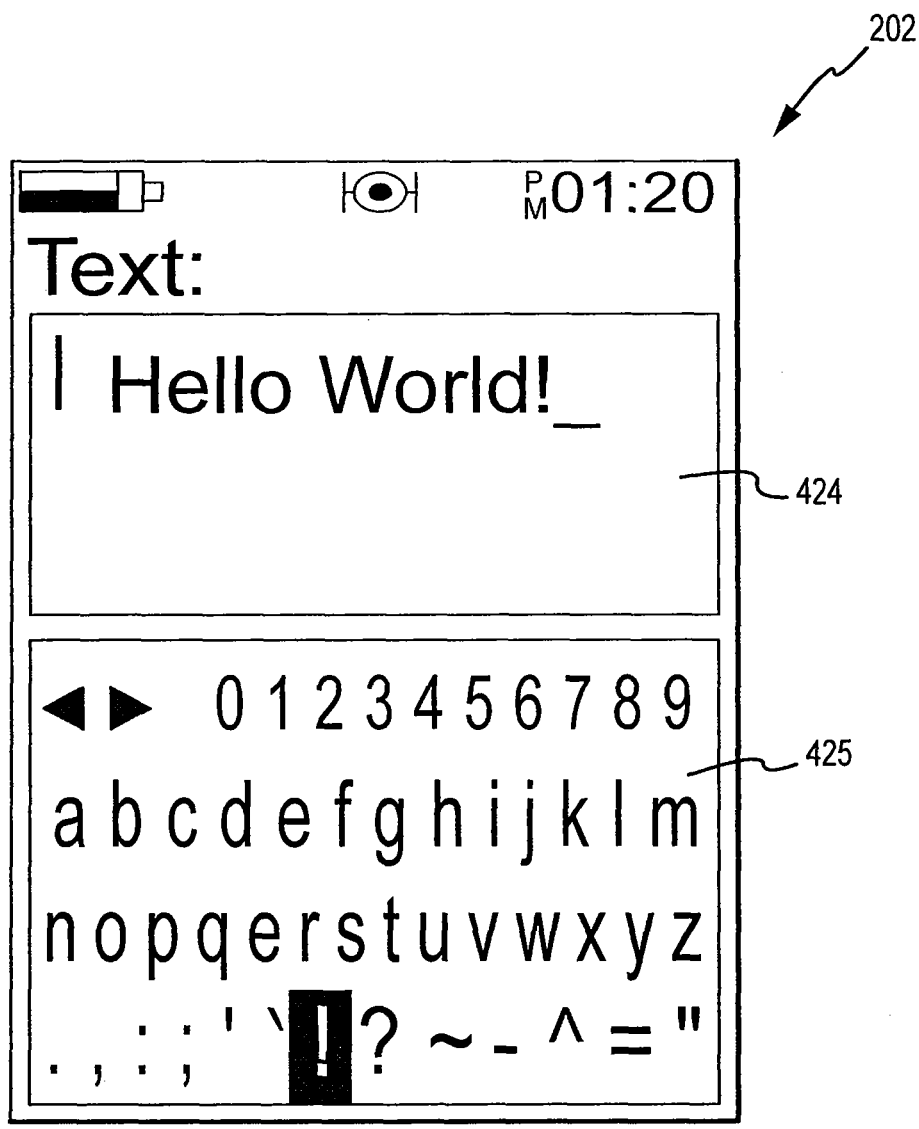
FIG. 4b illustrates a text message composition screen displayed on the LCD screen of the GPS unit.

A messaging icon 407 is an illustration of an envelope and when selected causes the unit to send and receive text messages. If the user chooses to send a text message, the unit displays a message composition screen on the LCD display 202. The message composition screen is illustrated in FIG. 4b. A virtual keyboard 425 appears below a message composition area 424 allowing the user to select different text characters to compose his message. The virtual keyboard 425 allows a user to select different characters by maneuvering the joystick 207, a stylus, finger or other object to different. Once the message has been composed, the unit displays a request to confirm that the message is ready to be sent. After the user has confirmed that the message is ready to be sent, the unit displays a screen requesting the user to determine whether the message should be transmitted to all units within a particular group or only to a specific unit.

If the unit has received a message, the informational message icon is displayed on the LCD main screen alerting the user that a message has been received. The user may then select the read messages option, once the option has been selected, the unit to displays a mailbox including all new and previous messages. The user may then select which messages he wishes to read by using the joystick 207 to maneuver between messages. The read message screen is then displayed, displaying the sender's identification name as well as the message. Finally, the unit displays an option to reply to the new message. The user may then choose the reply option, which causes the unit to display the message composition screen.

An extras icon 408 allows for a user to enter in information. For example, agency or departmental data, such as telephone numbers, radio frequencies etc. The information is stored in the memory, but accessed through the extras function. The extras icon 408 is 408 represented by briefcase graphic. Additionally, a calendar is included under the extras icon 408. The calendar is a standard monthly calendar illustrating the current day and may be view by week, month or day. The extras function may be easily modify to include other standard information by connecting the unit to a PC or laptop and using the utilities icon.

A tools icon 409 may be represented by a graphical depiction of a screwdriver and wrench. The tools function is the system setup utility and causes the device to display a variety of settings options of the GPS unit 101. The settings displayed are user name, time zone, time and date format, unit display contrast, unit position format and map datum format, measurement for distance and speed (miles per hour, kilometers per hour, etc.), temperature units (Celsius, Fahrenheit, Kelvin), elevation units (feet, meters, yards or other measurement unit), GPS startup, unit power management, language, power up log, G-Mouse on/off, RX mute, SOS timer, baud rate, as well as logged system information to the user such as but not limited to: battery voltage, stored waypoints and tracks, and memory percentage used. For example, the user may change his identification name or group membership. However, in one embodiment, the user may only view his hardware identification name and not modify it. If the SOS setting is selected the GPS unit 101 will transmit its location and user identification at timed intervals. This intervals in one embodiment range between two seconds and 99 minutes.

The G-Mouse on/off option allows the user to transmit information via the USB UART to a personal computer, modem or other device through the device's USB port or serial port. The RX Mute turns on and off the trailing edge of the audible transmission. This silences the audible noise of the FFSK data burst, so that the user does not hear it transmitted, while still allowing the device to transmit it. The, Baud Rate allows a user to select the serial port speed, for instance between 9600, 4800, 19200 and 38400 baud. The logged system information displays on the unit the number of times that the unit was power up, its external temperature, the estimated battery power remaining, the number of stored waypoints and tracks and the percentage of the memory used.

A selection tool icon 424 may be represented by an outline of a square and the display indicates the icon that the joystick 207 is currently able to select. This allows the user to be able to knowingly select the correct functions. The selection tool 424 may be any sort of graphic or indicator. For example, the selection tool may simply be an animation of the icon it is highlighting, circular, rectangular or any other shape, or may cause the functional icon it is selecting to change colors. The display of the selection tool 424 is not related to the functionality of the GPS unit 101 and is simply a tool making it easier for the user to access different functions of the unit 101.

Figure 5:
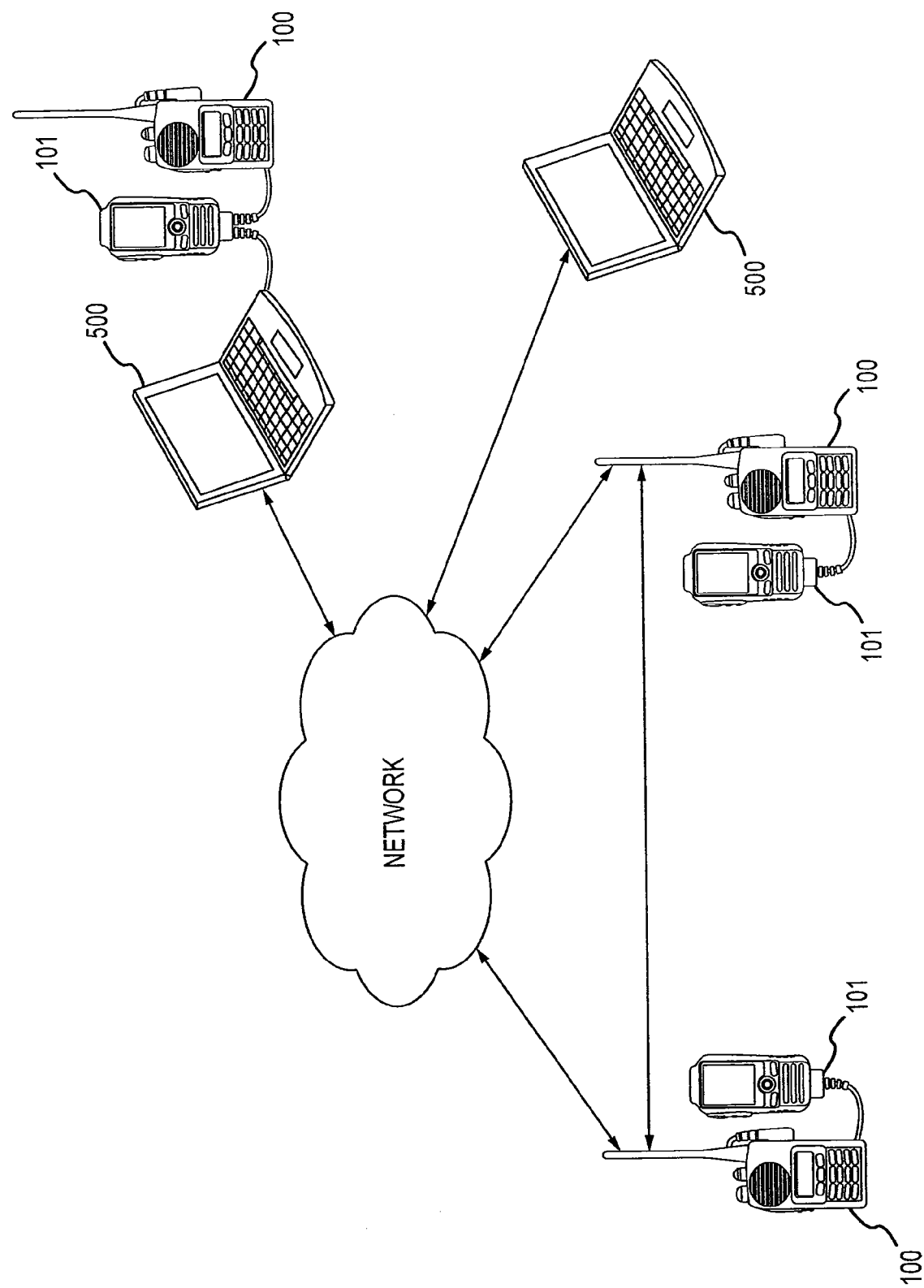
FIG. 5 is a diagram illustrating GPS units connected to communication devices and transmitting information between units and to a computer over a radio network.

FIG. 5 illustrates multiple GPS units 101 each connected to communication device 100. The GPS units 101 transmit and receive signals via the communication devices 100. In this example, the communication devices are two-way radios and transmit the signals to each other through radio waves, digital or analog. As discussed with respect FIG. 1, the GPS unit and two-way radio are connected to each other through a signal cable. The signal cable enables the GPS unit to send and receive signals from the two-way radio. The two-way radios transmit waves through the atmosphere until reaching other two-way radios. Additionally, the field GPS units 101 communicate to a computer base station 500 and a field computer 500, there may be more base stations included, however in FIG. 5 only two base stations are depicted. The base stations 500 may be placed in the field along with the GPS units 101 and communicate via radio waves or the base station may be located away from the field and communicate with the units 101 through an Internet or cellular connection. For example, the base station 500 may connect to the unit through a USB, serial connection or wireless connection. For example, in one embodiment a communication device is connected to a GPS unit and the GPS unit is connected to the base station via the USB port of the base station 500.

Figure 6:
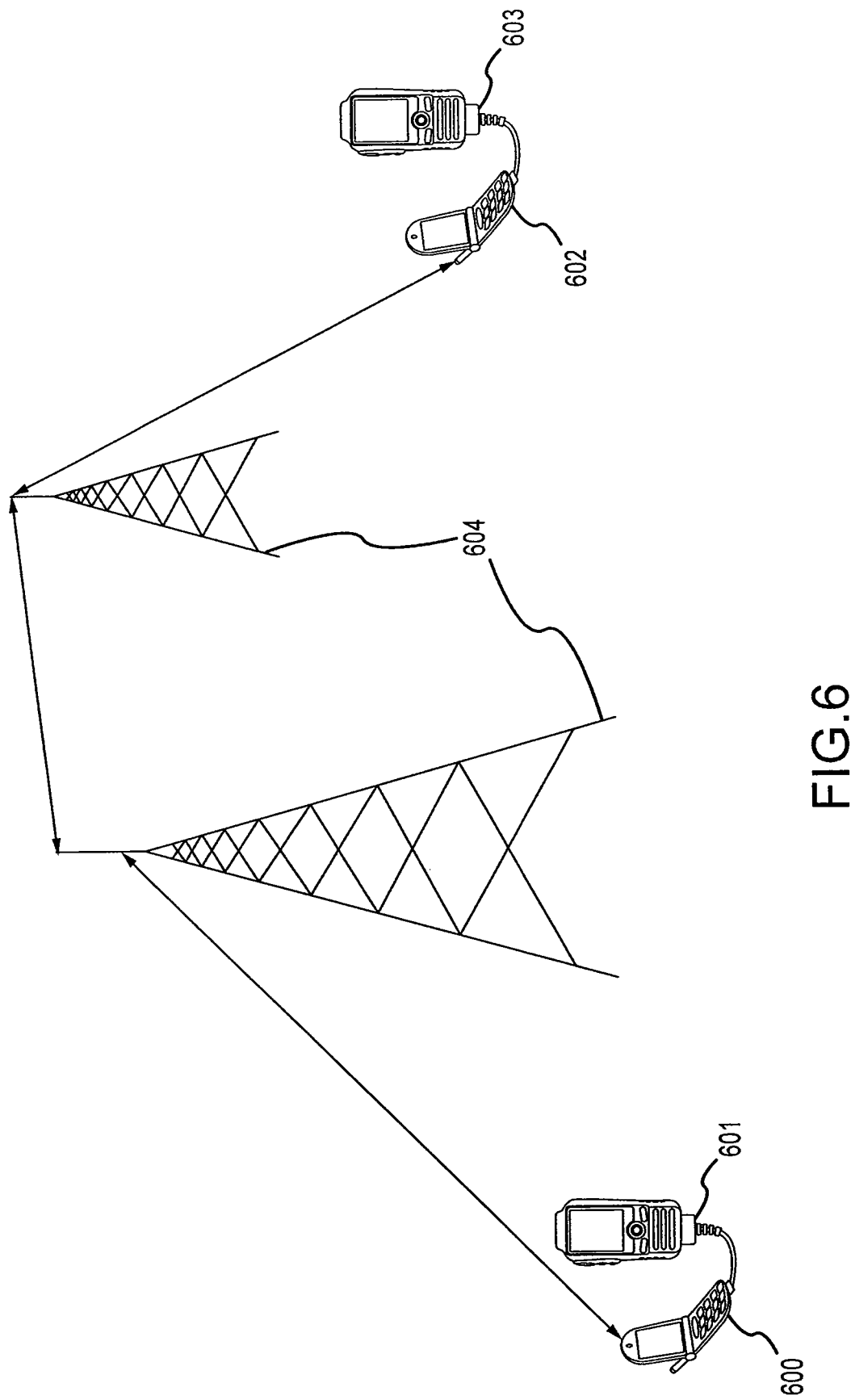
FIG. 6 is a diagram illustrating the GPS units connected to cell phones communicating over a cellular network.

In another embodiment, the base station includes a radio transceiver externally located, such as on the top of a building. This radio transceiver receives radio transmissions on the selected channel and then supplies them to the GPS unit connected via to the USB port of the base station. The USB output then transmits information from the GPS unit 101 to the base station 500. This allows the base station 500 to display all units and their current location and other travel information. Once connected, the base station 500 computer may include mapping software such as GOOGLE EARTH or TERRALOOK and the base station user may track in real time, the positions, speed, temperature, altitude, and all other relevant information of all users. Additionally, the base station 500 may poll each user in the field to automatically receive updates to more accurately track their locations in real time. The base station 500 may also send text messages to the other users and has the same capabilities as each user, therefore may receive, track and store information and send messages to each unit FIG. 6 illustrates multiple GPS units 601, 603 connected to cell phones 600, 602. The GPS units 601, 603 in this embodiment communicate with each other through cell phones 600, 602. The cell phones 600, 602 transmit signals on a cellular network, using cell towers 604 to reflect the signals almost anywhere. In this embodiment the GPS units 601, 603 may be located on different continents and as long as there is a cellular network in both locations, the GPS units 601, 603 may send and receive data from each other. The first cell phone 600 receives a signal from the first GPS unit 601 and transmits the signal to the first cell tower 604 which then sends the signal to other cell towers until it reaches the second cell phone 602. The second cell phone 602 then communicates the signal to the second GPS unit 603 via the connection cable 109.

Figure 7:
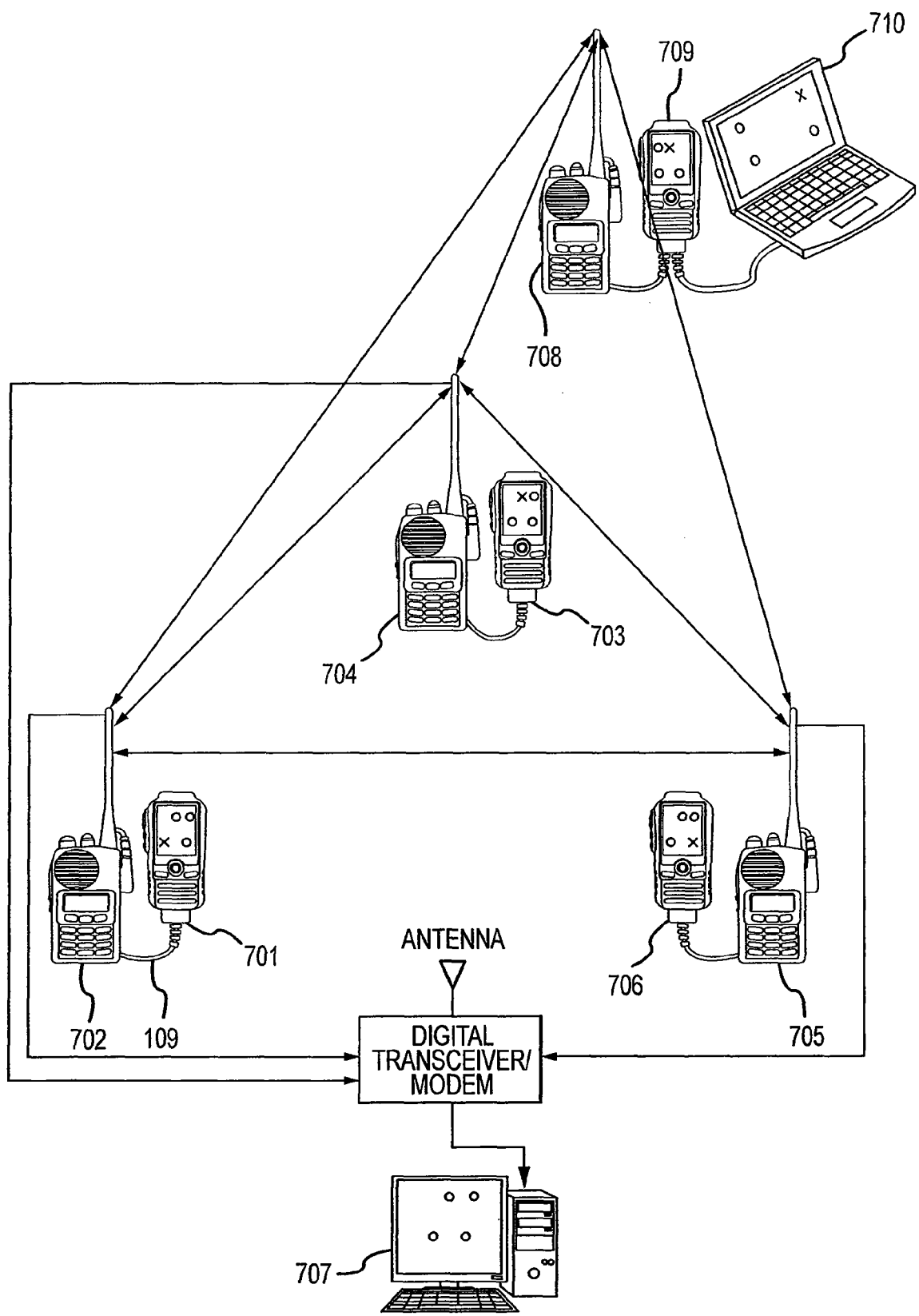
FIG. 7 is a diagram illustrating multiple GPS units connected to communication devices using the group list function.

FIG. 7 illustrates multiple GPS units 701, 703, 705 connected to communication devices 702, 704, 706 transmitting and receiving signals to each other, a base station computer 707 with a digital transceiver, and to a field computer 710 connected to a two-way radio 708 and GPS unit 709. Using the group list function, each GPS unit sees its position relative to the other units. For example, user of the first GPS unit 701 sees himself, displayed on the LCD screen, located southwest relative to the other users of second and third GPS units 703, 705. User of the second GPS unit 703 is able to see that he is located north of the other users. User of the third GPS unit 705 is able to notice that he is located south of second user 703 and east of the first user 701. The user of the field computer 710 is able to view his location as northwest of the other users. In addition to viewing his position on his GPS unit 709, he is able to view his position on the computer 710. Additionally, each user may view the name of each other user as well as the hardware identification of each unit. The base station 707 and field computer 710 are able to see the position of each user not only relative to each other, but also overlaid on a map depicting the actual location of each user. The real-time tracking is performed by the computer by using the actual GPS coordinates of each user loaded into mapping software. The base station 707, field computer 710 and individual users may also screen which users are illustrated on their units. For instance, user of the first GPS unit 701 may wish only to view user of the second GPS unit 703, in that case the display would only illustrate that he was located behind the second GPS unit 703.

All directional references (e.g. upper, lower, upward, downward, left, right, leftward, rightward, top, bottom, above, below, inner, outer, vertical, horizontal, clockwise and counterclockwise) are only used for identification purposes to aid the reader's understanding of examples of the invention, and do not create limitations, particularly as to position, orientation, or use of the invention unless specifically set forth in the claims. Joinder references (e.g. attached, coupled, connected, joined and the like) are to be construed broadly and may include intermediate members between a connection of elements and relative movement between elements. As such, joinder references do not necessarily infer that two elements are directly connected and in a fixed relation to each other.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally examples rather than limiting in scope.

The invention claimed is:
1. A mobile navigation and communication device comprising:
a global positioning system (GPS) receiver that receives a positional signal from a satellite and determines position information of a navigation device;

a microprocessor in communication with the GPS receiver, the microprocessor configured to receive the position information from the GPS receiver;

the microprocessor further configured to receive voice signals and position information from a plurality of other mobile navigation and communication devices through a communication device;

the microprocessor further configured to determine a location of the plurality of other navigation devices based upon the received position information from other devices, and;

a liquid crystal display (LCD) in communication with the microprocessor, the LCD providing a display of the location of the plurality of navigation devices relative to the navigation device;

wherein the navigation device is configured to be coupled to but separate from the communication device.

2. The mobile navigation and communication device of claim 1 further comprising:

a connection port in communication with the microprocessor, the connection port couples the navigation device to the communication device, wherein the connection port sends output signals to the communication device, the output signals include at least one of a user voice signal and the position information;

wherein the communication device receives input signals and providing provides the input signals to the connection port, and the input signals include at least one of voice and position information transmitted to the communication device from the plurality of other mobile navigation and communication devices.

3. The mobile navigation and communication device of claim 2 wherein the communication device is a two-way radio.

4. The mobile navigation and communication device of claim 2 wherein the communication device is a cellular phone.

5. The mobile navigation and communication device of claim 2 further comprising:

a speaker, the speaker in communication with the microprocessor, wherein the speaker translates the voice input signal into audio sounds;

a microphone, the microphone in communication with the microprocessor, wherein the microphone translates an audio sound into the user voice signal output.

6. The mobile navigation and communication device of claim 5 further comprising a push-to-talk (PTT) input, the PTT input in communication with the microprocessor, wherein the PTT input controls when the connection port sends and receives signals from the communication device.

7. The mobile navigation and communication device of claim 2 wherein the microprocessor is further configured to determine the coordinates of a waypoint.

8. The mobile navigation and communication device of claim 7 wherein the output signals further include the waypoint coordinates and waypoint information.

9. The mobile navigation and communication device of claim 8 wherein the waypoint information comprises at least one of a waypoint name, a waypoint graphic and waypoint altitude.

10. The mobile navigation and communication device of claim 1 further comprising a thermometer, wherein the thermometer is in communication with the microprocessor.

11. The mobile navigation and communication device of claim 1 wherein the position information includes at least one of latitude, longitude and altitude.

12. The mobile navigation and communication device of claim 1 further comprising a compass, wherein the compass is in communication with the microprocessor.

13. The mobile navigation and communication device of claim 2 further comprising a lithium ion battery, wherein the lithium ion battery is in communication with the microprocessor.

14. The mobile navigation and communication device of claim 2 wherein the input signals further comprise a power signal, wherein the power signal supplies power to the mobile navigation and communication device.

15. The mobile navigation and communication device of claim 2 wherein:

the output signals further comprise a text message signal; and the input signals further comprise a text message signal.

16. A mobile navigation and communication device comprising:

a global positioning system (GPS) receiver that receives positional signals from a satellite and determines the position coordinates of the navigation device;

a microprocessor in communication with the GPS receiver, the microprocessor configured to receive the position information from the GPS receiver;

the microprocessor further configured to receive voice signals and position information from a plurality of other mobile navigation and communication devices;

the microprocessor further configured to determine a location of the plurality of other navigation devices based upon the received position information from other devices;

the microprocessor further configured to determine the speed and total distance traveled of the plurality of other navigation devices based upon the received position information from other devices;

a liquid crystal display (LCD) in communication with the microprocessor, the LCD providing a display of the location of the plurality of navigation devices relative to the navigation devices and a display of the speed and total distance traveled by each of the plurality of navigation devices; and a user interface in communication with the microprocessor, the user interface providing a mechanism to selectively display the voice signals, position information, speed and total distance traveled of the navigation device and the plurality of navigation devices on the LCD.

17. The mobile navigation and communication device of claim 16 further comprising:

a connection port in communication with the microprocessor, the connection port couples the navigation device to a communication device, wherein the connection port sends output signals to the communication device, the output signals include at least one of a user voice signal and one of the position information;

a communication device coupled with the connection port, the communication device receiving input signals and providing the inputs signals to the connection port, the input signals include at least one of voice and position information transmitted to the communication device from the plurality of other navigation devices.

18. The mobile navigation and communication device of claim 17 wherein the communication device is one of a two-way radio and a cellular phone.

19. The mobile navigation and communication device of claim 17 further comprising:

a speaker, the speaker in communication with the microprocessor, wherein the speaker translates the voice input signal into audio sounds;

a microphone, the microphone in communication with the microprocessor, wherein the microphone translates an audio sound into the user voice signal output;

a push-to-talk (PTT) input, the PTT input in communization with the microprocessor, wherein the PTT input controls when the connection port sends and receives signals from the communication device; and wherein the user interface is a joystick.

20. The mobile navigation and communication device of claim 17 wherein:

the microprocessor is further configured to determine the coordinates of a waypoint;

the output signals further include the waypoint coordinates and waypoint information; and the waypoint information comprises at least one of a waypoint name, a waypoint graphic and a waypoint altitude.

21. The mobile navigation and communication device of claim 16 further comprising a thermometer, wherein the thermometer is in communication with the microprocessor.

22. The mobile navigation and communication device of claim 16 wherein the position information includes at least one of latitude, longitude and altitude.

23. The mobile navigation and communication device of claim 16 further comprising a compass, wherein the compass is in communication with the microprocessor.

24. The mobile navigation and communication device of claim 17 further comprising:

a lithium ion battery, wherein the lithium ion battery is in communication with the microprocessor; and a power signal, wherein the power signal supplies power to the mobile navigation and communication device.

25. The mobile navigation and communication device of claim 17 wherein:

the output signals further comprise a text message signal;

the input signals further comprise a text message signal; and the microprocessor is further configured to provide a text message output.

26. The mobile navigation and communication device of claim 16 wherein:

the microprocessor is further configured to determine the estimated time of travel from position coordinates of the mobile navigation and communication device to at least one of the plurality of other navigation devices;

the microprocessor is further configured to receive a group identification signal and an individual identification signal;

the LCD is further configured to display the estimated time of travel to the other navigation devices;

the user interface selectively displays the speed, total distance traveled, location, estimated time of travel for a group of navigation devices or an individual navigation device.

* * * * *